(12) United States Patent
Nuernberger

(10) Patent No.: US 12,369,538 B2
(45) Date of Patent: Jul. 29, 2025

(54) COPPICE-WITH-STANDARD, PROCESS FOR ESTABLISHING THE COPPICE-WITH-STANDARD, AND PROCESS FOR CONVERTING THE COPPICE-WITH-STANDARD INTO A COMMERCIAL-PERMANENT-FOREST

(71) Applicant: Michael Nuernberger, Brand bei Marktredwitz (DE)

(72) Inventor: Michael Nuernberger, Brand bei Marktredwitz (DE)

( * ) Notice: Subject to any disclaimer, the term of this patent is extended or adjusted under 35 U.S.C. 154(b) by 852 days.

(21) Appl. No.: 17/631,004

(22) PCT Filed: Jul. 30, 2020

(86) PCT No.: PCT/EP2020/071494
§ 371 (c)(1),
(2) Date: Jan. 28, 2022

(87) PCT Pub. No.: WO2021/019010
PCT Pub. Date: Feb. 4, 2021

(65) Prior Publication Data
US 2022/0277240 A1 Sep. 1, 2022

(30) Foreign Application Priority Data
Jul. 31, 2019 (DE) ................. 10 2019 120 745.2

(51) Int. Cl.
*A01G 23/00* (2006.01)
*G06Q 50/02* (2012.01)
(52) U.S. Cl.
CPC ............ *A01G 23/00* (2013.01); *G06Q 50/02* (2013.01)

(58) Field of Classification Search
CPC ................. A01G 23/00; A01C 21/00
(Continued)

(56) References Cited

U.S. PATENT DOCUMENTS

| | | | |
|---|---|---|---|
| 4,838,328 A * | 6/1989 | Herolf | A01G 23/08 30/379.5 |
| 7,412,932 B1 * | 8/2008 | Bigelow | A01G 23/00 111/923 |

(Continued)

FOREIGN PATENT DOCUMENTS

| | | |
|---|---|---|
| DE | 102016111120 B3 | 9/2017 |
| DE | 102016007175 A1 | 12/2017 |

OTHER PUBLICATIONS

International Search Report issued for the corresponding international patent application No. PCT/EP2020/071494, dated Nov. 4, 2020, 2 pages (for informational purposes only).

(Continued)

*Primary Examiner* — Jamie L McGowan
(74) *Attorney, Agent, or Firm* — Viering, Jentschura & Partner mbB

(57) ABSTRACT

Coppice-with-standard with at least three permanent forest strips comprising permanent forest trees and at least two coppice strips comprising coppice trees, wherein coppice strips and permanent forest strips are arranged alternately, so that recurrently at least one coppice strip is arranged between two permanent forest strips immediately adjacent thereto, wherein the permanent forest trees in the permanent forest strips each form a permanent forest corridor and wherein the shortest distance between adjacent permanent forest corridors is 4 to 11 m.

8 Claims, 10 Drawing Sheets

(58) Field of Classification Search
USPC .......................................................... 111/100
See application file for complete search history.

(56) References Cited

U.S. PATENT DOCUMENTS

| | | | | |
|---|---|---|---|---|
| 8,042,300 | B2* | 10/2011 | Bigelow | ................ A01G 23/00 111/923 |
| 8,091,328 | B2* | 1/2012 | Teetaert | ................ A01D 43/08 56/157 |
| 8,220,238 | B2* | 7/2012 | Teetaert | ................ A01D 43/08 56/157 |
| 8,833,280 | B2* | 9/2014 | Leist | ...................... A01C 21/00 111/923 |
| 9,585,314 | B2* | 3/2017 | Sulman | ................ A01G 23/093 |
| 2003/0075087 | A1* | 4/2003 | Gould | .................... A01C 11/00 111/900 |
| 2004/0268428 | A1* | 12/2004 | Duzan, Jr. | ............. A01G 23/00 800/260 |
| 2010/0139229 | A1* | 6/2010 | Teetaert | ................ A01D 43/08 56/119 |
| 2010/0307396 | A1* | 12/2010 | Duzan, Jr. | ............. A01G 23/00 47/1.43 |
| 2012/0073705 | A1* | 3/2012 | Sulman | ................ A01G 23/093 144/337 |
| 2012/0145056 | A1 | 6/2012 | Leist et al. | |

OTHER PUBLICATIONS

Search Report issued for the corresponding German patent application No. 10 2019 120 745.2, dated Apr. 24, 2020, 4 pages (for informational purposes only).
Landesbetrieb Wald Und Holz Nordrhein-Westfalen, "Empfehlungen für die Wiederbewaldung der Orkanflächen", 2007, 160 pages (including 80 pages English translation).

* cited by examiner

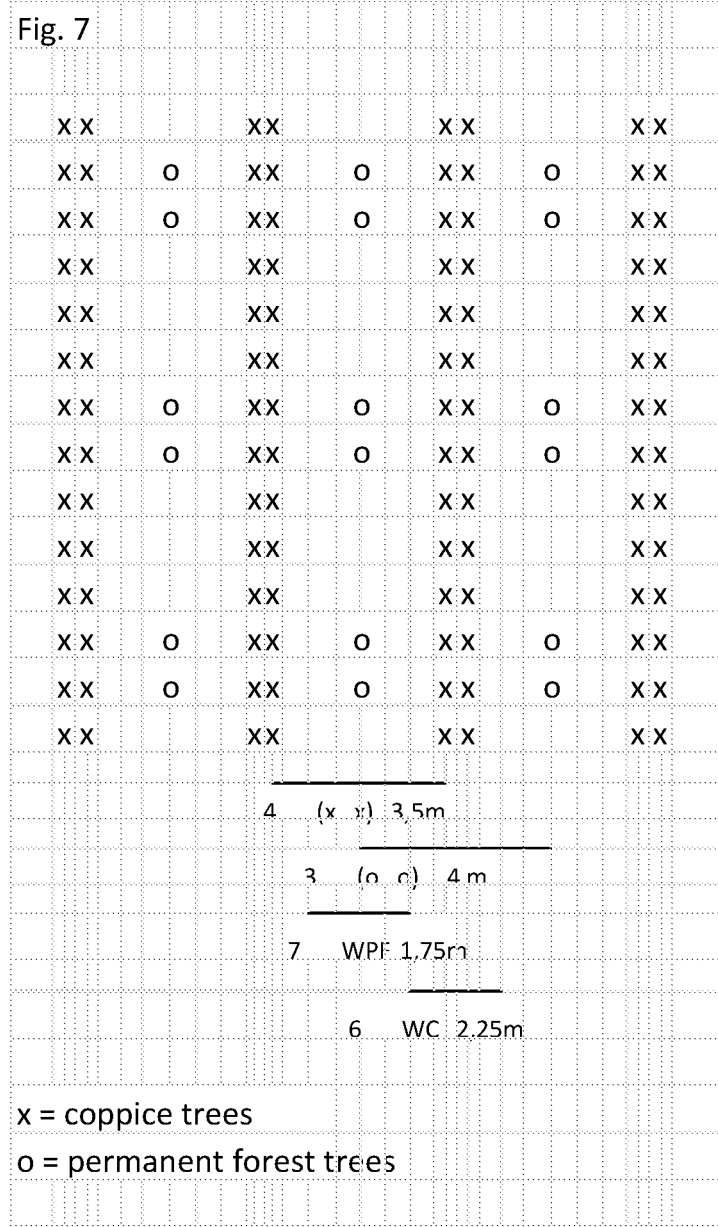

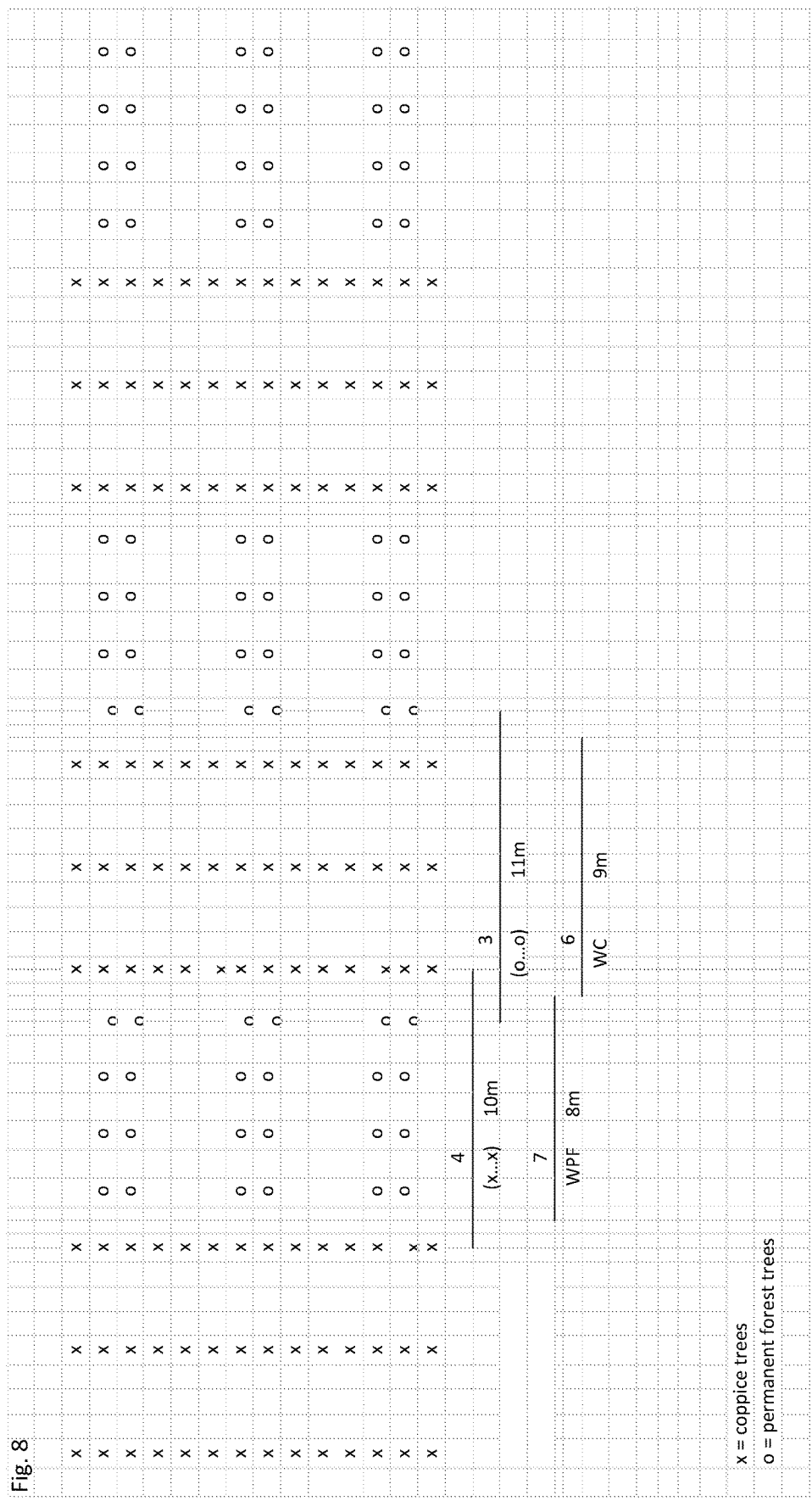

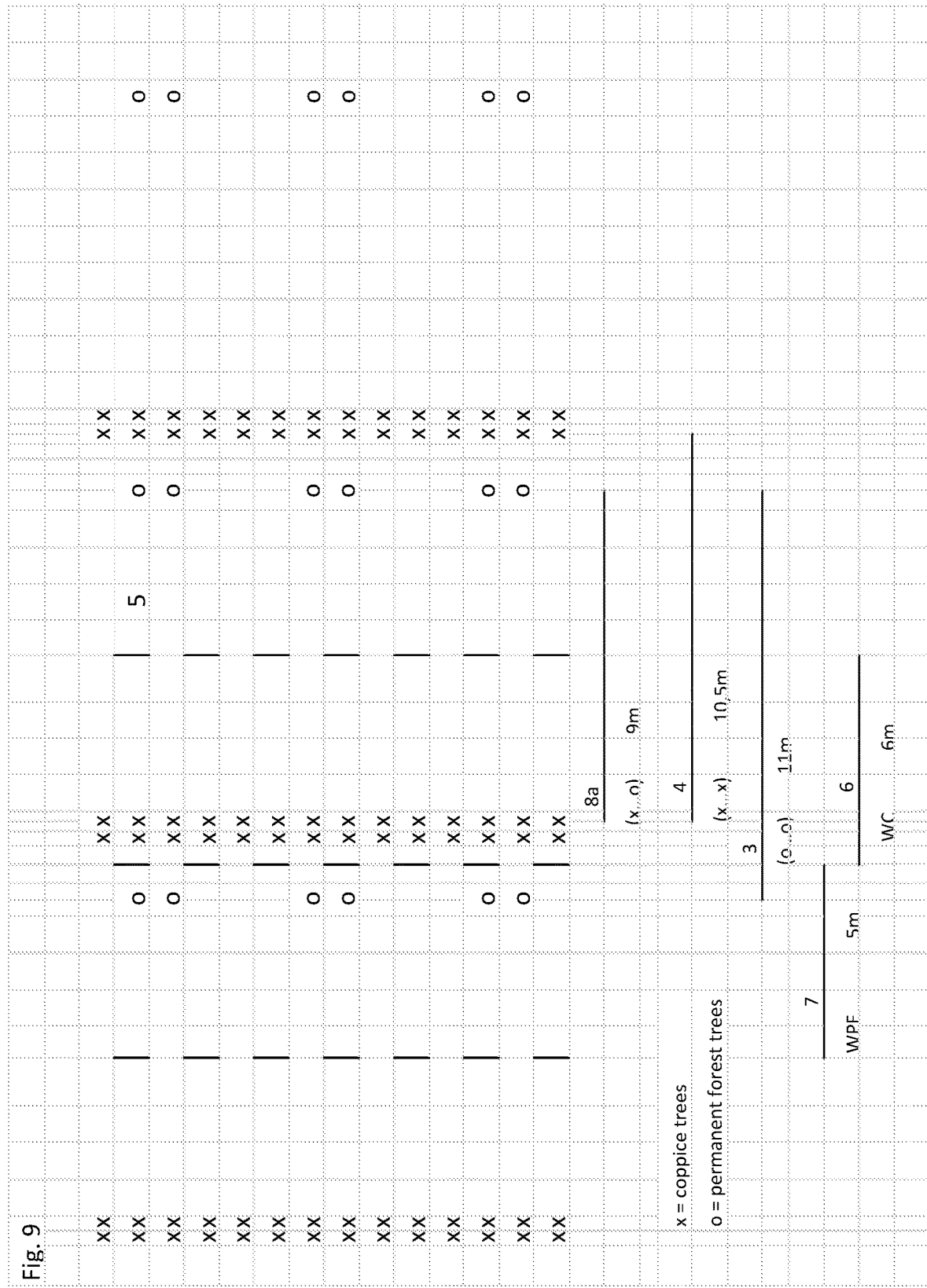

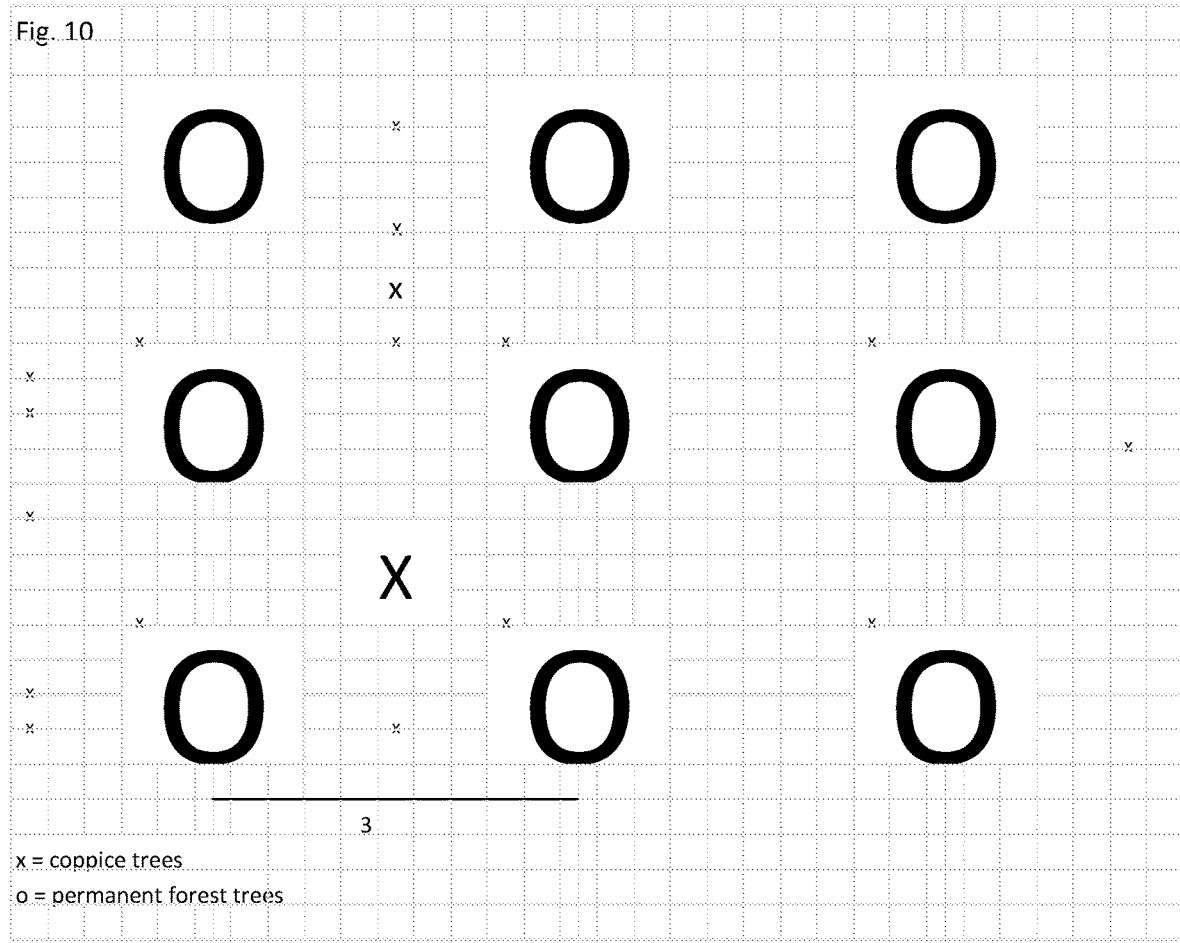

COPPICE-WITH-STANDARD, PROCESS FOR ESTABLISHING THE COPPICE-WITH-STANDARD, AND PROCESS FOR CONVERTING THE COPPICE-WITH-STANDARD INTO A COMMERCIAL-PERMANENT-FOREST

TECHNICAL FIELD

The present invention relates to a coppice-with-standard, in particular a coppice-with-standard established strip-by-strip, with at least three permanent forest strips comprising permanent forest trees and at least two coppice strips comprising coppice trees, wherein coppice strips and permanent forest strips are arranged alternately; a process for establishing a coppice-with-standard; and a process for converting a coppice-with-standard into a commercial-permanent-forest.

BACKGROUND

A coppice-with-standard is a well-known type of silviculture. A coppice-with-standard is a two-layered forest consisting of underwood and overwood. The underwood is a stock layer of trees that remains at low level and grows from stump shoot or basal shoot. The underwood is regularly harvested at shorter intervals and mostly utilized as firewood. The overwood consists of older trees that are harvested only after a longer life span. The overwood-logs are mainly used for timber or furniture wood. Typical tree species in coppice-with-standards are pedunculate and sessile oak, ash, maple, elm and lime.

Establishment of this historical form of silviculture is carried out by leaving so-called overstock trees standing and harvesting the underwood from an originally unstructured stock of tree species. Harvesting the underwood is so cost-intensive due to the unstructured forest structure and the complex building of pathways in the forest that this type of silviculture is hardly practised nowadays, although the coppice-with-standard is a particularly ecological type of silviculture.

In the context of the present disclosure, the term "unstructured stock of tree species" refers to a stock of tree species that has not been deliberately (or systematically) planted, but has developed naturally (e.g. a stock of tree species that has developed on its own, e.g. by "flown-in seeds") or has been planted without a deliberate selection of tree species according to permanent forest trees and coppice trees and establishing them strip-by-strip in the form of permanent forest strips and coppice strips.

According to common practice, the establishment of a permanent forest is carried out in such a way that the provided initial afforestation area is homogeneously planted with one or more permanent forest tree species. Coppice tree species are not planted due to rapid juvenile growth, because the permanent forest culture could be endangered due to lack of light. Homogeneous means that the row spacing of the permanent forest tree rows is the same over the entire afforestation area and thus equally spaced. In course of time, individual permanent forest trees are removed, however entire tree rows are not removed; instead, only the highest-yield permanent forest trees are promoted through the removal of crowding trees, so that ultimately 80 to 600 pieces/ha permanent forest trees reach cutting age. Systematic harvesting and cutting back to the stump, as is common in traditional coppice forestry, is not practiced in this cultivation method. During initial afforestation of a permanent forest according to common practice, the humus build-up within the first 5 to 10 years is slow due to the usually low juvenile growth of the planted trees, because initially only small amounts of foliage fall to the ground due to the small crown diameters of the young permanent forest trees and, in addition, a low root density prevails in the topsoil. Furthermore, comparatively small amounts of biomass, that can be utilized thermally for example, accrue within the first 20 years, because permanent forest tree species generally only show increased wood growth rates from a tree age of 10 to 20 years.

Another common method of reforesting harvested commercial forests is to establish a permanent forest by means of a so-called pre-forest. In this case, pioneer tree species such as birch, rowan or aspen are first allowed to grow wild (for example flying-in of seeds) in the clear-cut forest area without human intervention and permanent forest trees are then planted in this randomly arranged pioneer tree pre-forest. Pioneer tree species suitable for this method are characterized by a permeable (for example pervious) crown-canopy, so that enough light can still fall on the freshly planted permanent forest trees. The pioneer tree species of the pre-forest can quickly become crowding trees of the permanent forest trees if they grow too densely. The harvesting or individual removal of pioneer trees is cumbersome, since, for example, skid trails must be created first. A strip-by-strip planting plan with pioneer tree species and permanent forest tree species is not known.

A common method of cultivating agricultural land is the establishment of coppice with fast-growing tree species, which are cultivated in short rotation—for example with rotation periods of 3 to 5 years. Establishing and cultivating fast-growing tree species in short rotation is not a forest but a permanent agricultural crop. The cultivation period of fast-growing trees is limited to 20 to 30 years. The reason for the limited cultivation period is the decline of the stump shoot with increasing age. These are mostly monocultures with only one tree species, which are cultivated only for a certain period. Short rotation with fast-growing tree species is mostly carried out using the tree species poplar or willow. The reason being low establishment costs because, in the case of poplar or willow tree species, saplings (e.g., one-year stem cuttings) can be used for planting instead of cuttings or seed. Cuttings are expensive for purchase and labor-intensive when establishing the culture. The seed itself is cheap and also the establishment with sowers is cheap but the regulation of the side-vegetation is very labor-intensive, as the seed needs a long time to form a 20 to 80 cm long young-stem.

Typically, at the end of the 20 to 30-year cultivation period, the roots of the coppice trees are shredded with a rotary tiller to a soil depth of 40 cm and the field is then prepared for the next cultivation. In this process, the permanent humus built up during the short rotation cultivation is almost completely re-converted and the carbon bound in the permanent humus is released into the environment as $CO_2$.

In principle, it is possible to let stand (from the German term "Überhälter") grow through from the stock with poplars or willows to establish a permanent forest. Disadvantages of this approach are that the fast-growing tree species are pioneer tree species characterized by a short maximum life span, that the wood is typically of lower value, and that there is a lack of tree species diversification.

DE 10 2016 111 120 B3 describes the cultivation of shade-loving plants, wherein a shade culture has been planted between rows of young trees. According to this disclosure, an essential feature is that the crown-canopy of the tree rows of the young trees produce at least 50% shade on the acreage of the shade-loving plants when establishing the shade-loving plants. The shade-loving plants are grown between rows (or strips) of trees which are 1 to 8 m apart from each other.

Furthermore, there are so-called agroforestry systems in which rows (or strips) of trees are planted at intervals of 16 to 100 m and conventional agriculture is practiced between the rows (or strips) of trees. A strong shading of the area agriculturally used and arranged between the rows (or strips) of trees is not desired, as this would push back the agricultural use. The crown-closure between trees of neighboring rows (or strips) of trees, which would lead to a strong shading of the agriculturally used area, is excluded by the large distances between the rows (or strips) of trees. The agricultural use of the intermediate area has a negative effect on the humus build-up, as the soil is turned with a plough.

Within the definition of agricultural land, "short rotation coppice" also exists as a so-called permanent culture. This means that theoretically an agroforestry system with "short rotation coppice" (as an agriculturally used strip) can be operated between rows of permanent forest trees, which are spaced, e.g., 16 to 100 m apart. An agroforestry system with "coppice in short rotation" remains, as a whole, an agricultural land and does not become a forest, because the large distance between the rows of trees (e.g. 16 to 100 m) results in that the forest-forming crown-closure does not come about. Quite to the contrary, the forest-forming crown-closure is deliberately prevented here. The agriculturally operated "coppice in short rotation"—which can also be located between agroforestry cultivated tree rows—is completely cleared again after a certain period of use of, e.g., 20 or 25 years.

In the context of the present disclosure the term "clearing" refers the removal of trees including their roots.

In the context of the present disclosure the term "forest" refers to an area of one hectare or more stocked with trees, wherein at least individual trees are sufficiently close to each other that the crowns of the trees may at least partially touch each other at adult-age (e.g. 50, 60, or 80 years).

No currently known silvicultural concept recommends upper forest (from the German term "Oberwald") target distances of more than 10 or 11 m.

An object of the present invention is to provide a viable and cost-effective system for establishing and operating a coppice-with-standard, which can be converted over time into an ecologically useful commercial-permanent-forest. A further object of the present invention is to produce, relatively quickly, a high biomass yield in the form of wood, and, thus, simultaneously causing a rapid build-up of humus in the topsoil, by cultivating fast-growing coppice trees strip-by-strip for a limited period.

SUMMARY

The present invention is directed to a coppice-with-standard with at least three permanent forest strips comprising permanent forest trees and at least two coppice strips comprising coppice trees, wherein coppice strips and permanent forest strips are arranged alternately, so that recurrently at least one coppice strip is arranged between two permanent forest strips immediately adjacent to it, wherein the permanent forest trees in the permanent forest strips each form a permanent forest corridor and wherein the shortest distance between adjacent permanent forest corridors is 4 to 11 m.

Preferably the average permanent forest strip width (AWPF) is smaller than the average coppice strip width (AWC).

Preferably the permanent forest strip width (WPF) is 1.75 to 8.00 m and the coppice strip width (WC) is 2.25 to 9.00 m.

Preferably at least 60% of all planted trees are coppice trees and at most 40% of all planted trees are permanent forest trees, based on the total number of planted trees at stock establishment.

Preferably, when establishing the permanent forest strips, less than 50% shade is cast on the permanent forest trees in the permanent forest strips by the coppice trees in the at least two coppice strips, in particular by the crown-canopy of the coppice trees.

Preferably, when establishing the coppice strips, at least one coppice tree species is planted selected from the group consisting of poplars, willows, elder, and laburnum, and, when establishing the permanent forest strips, at least one tree species is planted which does not belong to the group of coppice tree species.

Preferably, the shortest distance between adjacent coppice corridors is shorter than the shortest distance between adjacent permanent forest corridors.

Preferably the coppice-with-standard forest comprises a first and a second coppice strip, immediately adjacent to a permanent forest strip, wherein the outer-boundary-distance between the permanent forest corridor of the permanent forest strip and the coppice corridor of the first immediately adjacent coppice strip is different from the outer-boundary-distance between the permanent forest corridor of the permanent forest strip and the coppice corridor of the second immediately adjacent coppice strip.

Moreover, the present invention is directed to a process for establishing a coppice-with-standard with the process steps of (i) providing at least three permanent forest strips comprising permanent forest trees and (ii) providing at least two coppice strips comprising coppice trees, wherein coppice strips and permanent forest strips are arranged alternately, so that recurrently at least one coppice strip is arranged between two permanent forest strips immediately adjacent thereto, wherein the permanent forest trees in the permanent forest strips each form a habitation corridor, wherein the coppice trees in the coppice strips each form a habitation corridor, and wherein the shortest distance between adjacent permanent forest corridors is 4 to 11 m.

Moreover, the present invention is directed to a process for establishing a commercial-permanent-forest with the process steps of (i) establishing a coppice-with-standard as described above and (ii) recurrent harvesting of the coppice trees of the at least two coppice strips with rotation periods of 3 to 5 years, wherein the permanent forest trees established in the coppice-with-standard are not harvested completely during the process, but are removed individually up to a maximum overwood-target distance of 4 to 11 m, so that over time the coppice trees are darkened-out by the dominance of the permanent forest trees and the ratio of the wood stock in volume solid metres (VSM) of permanent forest trees to coppice trees is at least 1, so that a commercial-permanent-forest is established.

DESCRIPTION OF THE DRAWINGS

FIG. 7 shows a coppice-with-standard consisting of single-row permanent forest strips with grouped permanent forest trees alternating with double-row coppice strips. Numeral 3 shows the shortest distance between adjacent permanent forest corridors (o . . . o) in meters and numeral 4 shows the shortest distance between adjacent coppice corridors (x . . . x) in meters. Furthermore, numeral 7 shows the permanent forest strip width (WPF) and numeral 6 the coppice strip width (WC), respectively in meters.

FIG. 8 shows a coppice-with-standard consisting of quadruple-row permanent forest strips with grouped permanent forest trees alternating with triple-row coppice strips. Numeral 3 shows the shortest distance between adjacent permanent forest corridors (o . . . o) in meters and numeral 4 shows the shortest distance between adjacent coppice corridors (x . . . x) in meters. Furthermore, numeral 7 shows the permanent forest strip width (WPF) and numeral 6 the coppice strip width (WC), respectively in meters.

FIG. 9 shows a coppice-with-standard consisting of single-row permanent forest strips with grouped permanent forest trees alternating with double-row coppice strips. The shortest distance between adjacent permanent forest corridors (o . . . o), the shortest distance between adjacent coppice corridors (x . . . x) and numeral 8a, the shortest distance between the permanent forest corridor of a permanent forest strip and the coppice corridor of an immediately adjacent coppice strip (x . . . o), indicated in meters. Furthermore, the permanent forest strip width (WPF) and the coppice strip width (WC) are indicated in meters.

FIG. 10 shows a commercial-permanent-forest, for example, 40 years after stock establishment and conversion of the coppice-with-standard. In the commercial-permanent-forest, the permanent forest trees dominate in terms of wood stock in volume solid meters of stem wood. To display this change in volume solid meters, the symbols for the permanent forest trees were enlarged and the symbols for the coppice trees were mainly reduced in size and only enlarged in very isolated cases. FIG. 10 shows that isolated coppice trees of different sizes remain in the stock.

DETAILED DESCRIPTION

Figure 1:
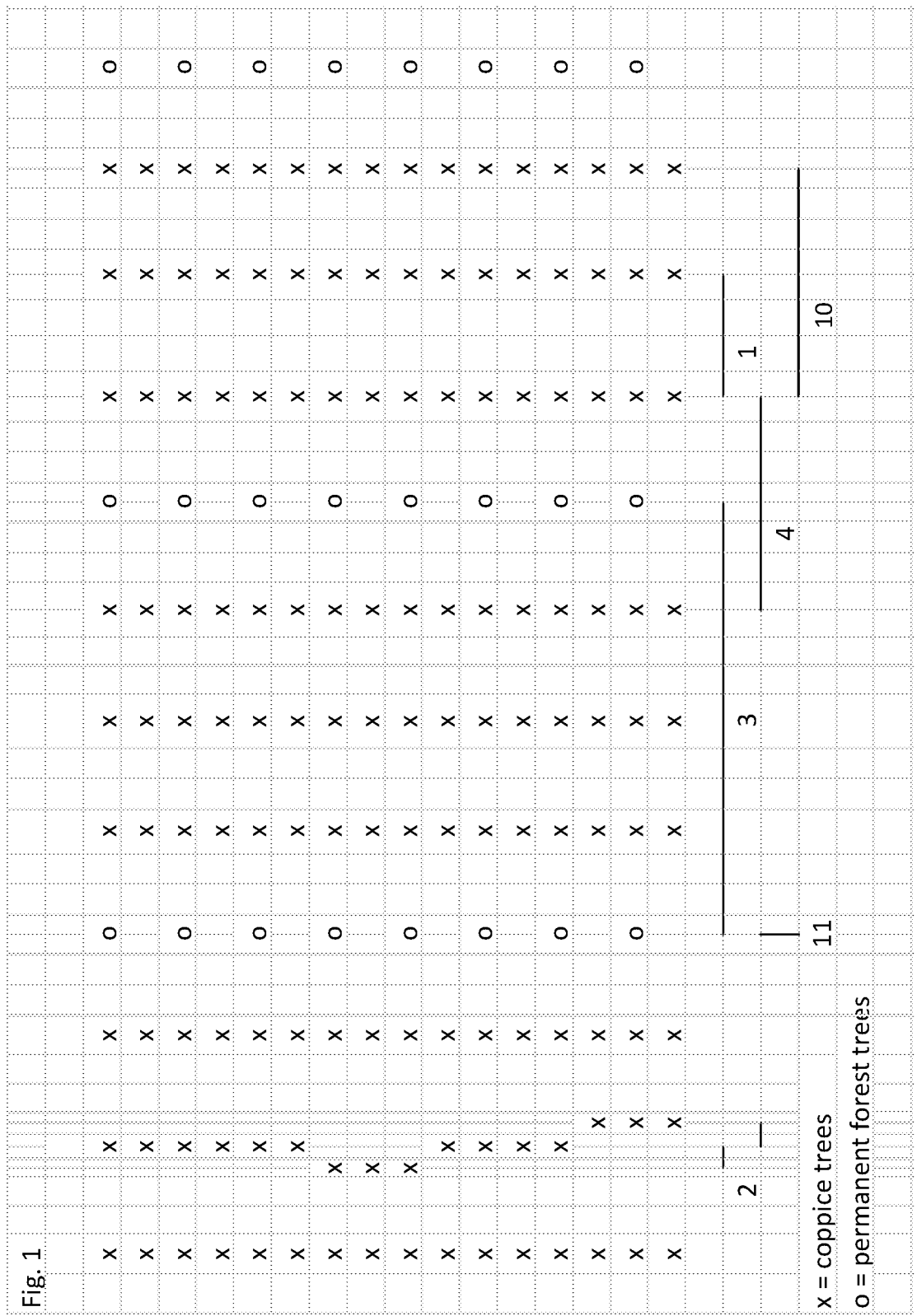
FIG. 1 shows a coppice-with-standard consisting of single-row permanent forest strips alternating with triple-row coppice strips. Numeral 1 shows the row spacing of the coppice rows within a coppice strip. Numeral 2 shows the deviation of the row spacing within a coppice row in relation to the main planting axis. Numeral 3 shows the shortest distance between adjacent permanent forest corridors (o . . . o). Numeral 4 shows the shortest distance between adjacent coppice corridors (x . . . x). Numeral 10 shows the coppice corridor width and numeral 11 shows the permanent forest corridor width.

The present invention relates to a structured coppice-with-standard which, in the underwood, through cultivation of fast-growing coppice trees in the form of coppice strips (or a delimited territory with an elongated layout which predominantly comprises coppice trees) produces an increased biomass yield in the form of wood and, at the same time, causes a faster humus build-up in the topsoil, and which, in the overwood, through the cultivation of permanent forest trees in the form of permanent forest strips (or rather a delimited territory with an elongated layout which predominantly comprises permanent forest trees), becomes the basis for an ecological commercial-permanent-forest that develops over time.

From an economic point of view, the described coppice-with-standard already provides large wood mass harvests at an early stage in the area of the coppice strips, which are significantly larger than the firewood mass of conventional coppices. The early yields from coppice strip cultivation are a welcome interim use, while the permanent forest is not yet producing any yields. In the case of the permanent forest trees, the preferred intended use is timber or furniture wood, where the permanent forest trees within the permanent forest strips can be maintained particularly easily and effectively, especially by machine, due to the good access. The maintenance effort for the upbringing of the permanent forest trees is further reduced due to the relatively small number of permanent forest trees.

From an ecological point of view, coppice cultivation within the strip-by-strip established coppice-with-standard represents a temporary interim solution. The fast-growing coppice trees produce a large wood mass in short rotation times which can be utilized for thermal or material purposes, for example. The coppice trees produce a lot of leaf and root litter in a short time which serves as "food" for the soil organisms and, thus, for the permanent humus build-up. Side-vegetation grows within the unstocked transition areas between permanent forest corridors and coppice corridors, which also accelerates the build-up of permanent humus. It is essential that the coppice trees are overgrown and darkened-out by the only partially or individually removed permanent forest trees after a cultivation period of, for example, 20 to 35 years, and that preferably no tillage takes place in the coppice strip during this time. This ensures that the permanent humus build-up previously achieved is also sustainable.

In particular, the desired forest type or tree species mixture (deciduous, coniferous or mixed forest) can be made by the forester in charge through the selection of tree species within the permanent forest strips. Here, both ecological and silvicultural aspects can be taken into consideration.

The cultivation of the coppice-with-standard established strip-by-strip with subsequent conversion to a commercial-permanent-forest has a mitigating effect on man-made $CO_2$ emissions. For example, with the help of the coppice cultivation described above, it is possible to bind a relatively large amount of $CO_2$ from the atmosphere relatively quickly by converting $CO_2$ to wood, roots and leaf litter via the photosynthesis process at the chlorophyll. The leaf litter remains on the surface and serves as food for the soil organisms to form long-term stable permanent humus in a multi-stage process. so-called root litter behaves similarly to leaf litter.

The wood of the coppice trees can be used, for example, as a substitute for fossil fuels (e.g. heating oil, coal or gas) through thermal utilization or as a material (chipboard production, biorefinery).

Overall, the silvicultural concept according to the present invention can realize an economic and, at the same time, ecologically attractive expansion of the forest share of the land area.

In particular, the present invention relates to a coppice-with-standard with at least three permanent forest strips comprising permanent forest trees and at least two coppice strips comprising coppice trees, wherein coppice strips and permanent forest strips are arranged alternately, so that recurrently at least one coppice strip is arranged between two permanent forest strips immediately adjacent thereto, wherein the permanent forest trees in the permanent forest strips each form a permanent forest corridor and wherein the coppice trees in the coppice strips each form a coppice corridor. Moreover, it is advantageous if the shortest distance between adjacent permanent forest corridors is 4 to 11 m, preferably 6 to 10 m, in particular 8 to 10 m. Preferably the average permanent forest strip width of the coppice-with-standard is smaller than the average coppice strip width of the coppice-with-standard.

In the context of the present disclosure, the term "coppice-with-standard" refers to a form of silviculture in which coppice and permanent forest are combined.

Thus, the coppice-with-standard consists of an old stock in the form of overwood of predominantly permanent forest trees and a young growth in the form of underwood of predominantly coppice trees. The underwood is harvested in its entirety at regular intervals and utilized, for example, as firewood. Typically, the underwood are stump shoots.

In the overwood, only individual permanent forest trees are removed after stock establishment, so that on the one hand individual overwood-target-trees are promoted and that on the other hand a forest-forming closed crown-canopy can still be established.

According to one embodiment, the coppice-with-standard described above is established on agriculturally used land by alternately planting strips in coppice cultivation (or rather coppice strips; or rather a delimited territory with an elongated layout which predominantly comprises coppice trees) and strips in permanent forest cultivation (or rather permanent forest strips; or rather a delimited territory with an elongated layout which predominantly comprises permanent forest trees). In other words, the coppice-with-standard described is characterized by alternating, in particular recurrently alternating, strips established predominantly with coppice trees and strips established predominantly with permanent forest trees.

The establishment of the coppice-with-standard takes place on agricultural lands. These preferably have an area of at least 1 hectare (ha), more preferably an area of at least 3 ha, in particular an area of at least 5 ha.

According to one embodiment, the coppice-with-standard has at least five permanent forest strips that are predominantly planted with permanent forest trees and at least five coppice strips that are predominantly planted with coppice trees, which alternate recurrently.

According to one embodiment, the coppice-with-standard has at least ten permanent forest strips that are predominantly planted with permanent forest trees and at least ten coppice strips that are predominantly planted with coppice trees, which alternate recurrently.

According to one embodiment, the coppice-with-standard has at least twenty permanent forest strips planted predominantly with permanent forest trees and at least twenty coppice strips planted predominantly with coppice trees, which alternate recurrently.

In the context of the present disclosure, the term "planted predominantly with coppice trees" means planting wherein at least 50% coppice trees are planted, preferably at least 75%, more preferably at least 85%, in particular at least 95%, based on the total number of tree species planted.

In the context of the present disclosure, the term "planted predominantly with permanent forest trees" means planting wherein at least 50% permanent forest trees are planted, preferably at least 75%, more preferably at least 85%, in particular at least 95%, based on the total number of tree species planted.

In other words, the coppice strip a large number of coppice trees are present which are harvested in short rotation, wherein, when establishing the coppice strips, at least 50% of the coppice trees are planted, preferably at least 75%, more preferably at least 85%, in particular at least 95%, based on the total number of tree species planted, and wherein the rotation periods are 1 to 20 years, preferably 2 to 8 years, in particular 3 to 5 years.

According to one embodiment at least 75% coppice trees are planted, based on the total number of tree species planted when establishing the coppice strips, which are then harvested, preferably with rotation periods of 3 to 5 years.

According to one embodiment 100% coppice trees are planted, based on the total number of tree species planted when establishing the coppice strips, which are then harvested, preferably with rotation times of 3 to 5 years.

In the permanent forest strip a large number of permanent forest trees are present which are harvested in long rotation, wherein, when establishing the permanent forest strips, at least 50% of permanent forest trees are planted, preferably at least 75%, more preferably at least 85%, in particular at least 95%, based on the total number of tree species planted, and wherein the rotation periods are more than 20 years, preferably more than 40 years, in particular more than 60 years. According to one embodiment at least 75% permanent forest trees are planted, based on the total number of tree species planted, which are then preferably harvested completely with rotation periods of 40 to 80 years or after reaching a diameter at breast height (DBH) of 30 to 60 cm.

According to one embodiment 100% permanent forest trees are planted, based on the total number of tree species planted when establishing the permanent forest strips, which are then preferably harvested in long rotation after reaching adult age.

In the context of the present disclosure, the terms "rotation" or "rotation period(s)" refer to the period from stock establishment to the first harvest in a tree strip (coppice strip or permanent forest strip) or the period until already harvested trees in a tree strip are harvested again. In other words, the terms "rotation" or "rotation period(s)", as used in the present disclosure, refer to the time that trees have been growing since establishment before they are preferably harvested for the first time, or the time that elapses before already harvested trees are harvested again.

During a harvest, at least 85% of the tree stock is harvested, preferably the tree stock is harvested completely. Completely means that at least 95% of all trees in the tree strip are harvested during a rotation. The harvesting of trees in a rotation takes place during a period of less than 18 months, preferably less than 6 months.

In particular, in the permanent forest strips, individual removal of permanent forest trees to promote the growth of adjacent permanent forest trees can take place from as early as 8 to 15 years. Individual removal is characterized by the removal or felling of individual trees within a strip of trees. Therefore, individual removal is not to be equated with harvesting. Several individual removals of permanent forest trees within permanent forest strips, which are carried out, for example, in temporal individual removal intervals of 3 to 5 years, can in total lead to a reduction of the permanent forest tree stock to less than 15% (more than 85% of the trees are removed) of the initial stock, without this being a rotation or harvest. In other words, the individual removal of the permanent forest trees, which takes place over several years, until the permanent forest trees remain at least in the overwood-target-distance of 4 to 11 m does not constitute a rotation and not a harvest.

The permanent forest trees are preferably harvested only when the overwood is felled at adult age (e.g. 40 to 80 years after stock establishment).

The term diameter at breast height (DBH) is a unit commonly used in forestry to indicate the thickness of a tree. To determine the DBH, the circumference of the standing tree is measured at a height of 1.40 m and divided by the number Tr.

According to one embodiment, preferably all coppice trees are sawn off (harvested) at a ground level of 5 to 25 cm during harvesting or rotation and then transported away. After harvesting, new shoots sprout again from the harvested coppice stumps (the so-called stump shoot), which are harvested again within another 3 to 5 years. While the coppice strips are harvested regularly only individual removals of permanent forest trees take place in the permanent forest strip so that on the one hand individual overwood-target-trees are promoted and on the other hand a closed forest-forming crown-canopy is still established. After a certain time, for example after 20 to 35 years, the crown-canopy of the permanent forest trees produce so much shade that the coppice trees hardly grow anymore and are darkened-out. In addition, from about 20 to 35 years after the establishment of the stock, the stump shoots are greatly weakened by the frequent harvesting of the coppice trees so that the permanent forest can also dominate for this reason. The short rotation of the coppice strip has thus ended, and the permanent forest trees dominate and form a commercial-permanent-forest.

In the first step, the initial afforestation area is thus a coppice-with-standard predominantly under coppice cultivation. When the performance of the coppice strips decreases or is pushed back, for example after 20 to 35 years, the coppice-with-standard is converted into a commercial-permanent-forest in a second step through the dominance of the permanent forest trees.

Thus, when establishing the coppice-with-standard described above, two different tree strips are planted (coppice strips and permanent forest strips) which differ in the way they are cultivated and in the tree species predominantly used when establishing each of the strips.

The establishment of the two different tree strips takes place in constant alternation. The alternation of the two different tree strips takes place more than twice, preferably more than ten times, in particular more than fifty times. The alternation of the two different tree strips can take place over the entire establishment area. In one embodiment, at least 75% of the establishment area is cultivated in a continuous alternation of coppice strips and permanent forest strips, preferably at least 85%. According to one embodiment, the entire establishment area is cultivated in a continuous alternation of coppice strips and permanent forest strips.

The establishment of the permanent forest strips and the establishment of the coppice strips can take place at the same time, for example within the same year, especially within the same month. In this case, when establishing the permanent forest strips, the coppice trees in the coppice strips, in particular the crown-canopy of the coppice trees in the coppice strips, predominantly do not produce any shade at the time of the stock establishment.

According to one embodiment, when establishing the permanent forest strips, less than 50% shade is cast on the permanent forest trees in the permanent forest strips by the coppice trees in the coppice strip, in particular by the crown-canopy of the coppice trees in the coppice strips, preferably less than 20%, in particular less than 10%.

Shadow can be defined and measured using the physical quantity of illuminance. Illuminance describes the luminous flux in lumens that is irradiated to an object per unit area in $m^2$. In this case, the object are permanent forest trees in a permanent forest strip. The illuminance has the measurement unit 1 lux. 1 lux corresponds to 1 lumen/$m^2$.

The "shade" is a relative value. The relative value compares the illuminance during the vegetation period that hits the permanent forest trees in a permanent forest strip without the coppice trees, in particular without the crown-canopy of the coppice trees, with the illuminance that hits the permanent forest trees in a permanent forest strip under the influence of the coppice trees, in particular without the influence of the crown-canopy of the coppice trees. It is important to bear in mind that the illuminance reaching the permanent forest trees in a permanent forest strip without the coppice trees, in particular without the crown-canopy of the coppice trees, is dependent on clouds, fog and earth rotation (darkness). The illuminance caused by solar radiation is approx. 90,000 lx under a clear sky in Germany at midday in summer. The angle of incidence is approx. 60°. With a 60° angle of incidence and a cloudy sky, the illuminance is only approx. 19,000 lx. The illuminance is measured with a luxmeter.

0% shade is present when the illuminance emitted by the sun during the vegetation period, which may be reduced by e.g. clouds, fog or the earth's rotation (day, night), hits the permanent forest trees in a permanent forest strip without additional screening. 50% shade is present if only 50% of the illuminance emitted by the sun during the vegetation period, which may be reduced e.g. by clouds, fog or the earth's rotation (day, night), hits the permanent forest trees in a permanent forest strip, because e.g. coppice trees, in particular crown-canopies of coppice trees in adjacent coppice strips, absorb or reflect 50% of the incident illuminance. 100% shade means that all light emission of the sun is prevented from reaching the permanent forest trees in a permanent forest strip.

The amount of light irradiation can be measured using a luxmeter, as described above. The indication of "[%] shade" refers to a given area. In the present case, this area is usually the area where the permanent forest trees grow. The percentage of shade is an average value over the area of interest. For example, for an area that is completely in half shade, the value 50% shade is given. The same value is given if half of the area has no shade while the other half is fully shaded.

The "shade" in [%] refers exclusively to shade during the vegetation period of the permanent forest trees. In central Europe the vegetation period is from the first of May to 31 October. In the southern hemisphere the vegetation period is from the first of November to 30 April.

According to one embodiment, at least 60% of all trees planted when establishing the coppice-with-standard are coppice trees and at most 40% of the trees when establishing the coppice-with-standard are permanent forest trees. For example, of the trees planted when establishing the coppice-with-standard, at least 70% are coppice trees, preferably at least 80%, in particular at least 90%.

A large number of coppice trees improves the initial humus build-up in the topsoil and significantly increases the initial root mass as well as the wood mass yield. A low number of permanent forest trees reduces the initial establishment costs, as the seed stock of permanent forest trees and planting itself is usually much more expensive compared to the seed stock of coppice trees. Coppice trees can, for example, be planted by means of inexpensive saplings with planting-machines for saplings, whereas permanent forest trees are traditionally planted by means of expensive rooted cuttings by hand with a spade.

Coppice Strips

In the coppice strips, predominantly coppice tree species are planted which are harvested after a rotation period of 1 to 20 years, preferably 2 to 8 years, in particular 3 to 5 years, for example with a forage harvester as wood chips and are utilized thermally or as material. The coppice trees in the coppice strip form the underwood of the coppice-with-standard. The harvest diameters at breast height (DBH) are preferably smaller than 30 cm, more preferably smaller than 20 cm, in particular smaller than 10 cm.

Geometrically, a coppice strip is defined by the length as well as the width of the coppice strip and the "coppice corridor" within it.

In the context of the present disclosure the term "coppice corridor" or "habitation corridor of the coppice strip" relates to a corridor in the form of a strip (or a delimited territory with an elongated layout) within the coppice strip with straight-line outer boundaries extending along the longitudinal direction of the coppice strip.

In case that the planting of coppice trees when establishing the coppice strip is carried out in rows extending substantially along the oblong extension direction of the coppice strip (for example if the coppice trees when establishing the coppice strip are planted at regular intervals in one or more rows extending substantially along the oblong extension direction of the coppice strip, so that continuous rows of coppice trees or groups of coppice trees are formed), the habitation corridor comprises 100% of the coppice trees planted when establishing the coppice strip. In this definition of the coppice corridor the habitation corridor of the coppice strip extends between the respective outermost rows of coppice trees (or between the two outer rows of coppice trees).

In case that the planting of coppice trees when establishing coppice strip is not exclusively in rows extending substantially along the oblong extension direction of the coppice strip (e.g. if the coppice trees are planted irregularly when establishing the coppice strip, or both in rows and irregularly), the habitation corridor comprises at least 75% of the coppice trees planted when establishing coppice strip, wherein the habitation corridor is selected in such a way that the width of the habitation corridor is as narrow as possible. In this definition of the coppice corridor isolated coppice trees located at the edge of the coppice strip (so-called "runaways") are not taken into account when determining the habitation corridor.

According to one embodiment the width of the coppice corridors is 0.4 to 7.5 m or 0.4 to 7 m, in particular 2 to 3 m. This is indicated, for example, in the figures with numeral 10.

Another important characteristic of the coppice-with-standard concerns the distances between the coppice corridors, in particular the shortest distance between the corridor-outer-boundaries of adjacent coppice corridors. The shortest distance of the corridor-outer-boundaries of adjacent coppice corridors is defined as "the shortest distance of adjacent coppice corridors".

In the context of the present disclosure the term "shortest distance between adjacent coppice corridors" relates to the shortest distance between the coppice corridors of two coppice strips immediately adjacent to a permanent forest strip, wherein the distance between the coppice corridors of two coppice strips immediately adjacent to a permanent forest strip (i.e. the distance between the coppice corridors of two coppice strips which, together with a permanent forest strip, form the sequence coppice strip-permanent forest strip-coppice strip) is determined by the mean distance between two opposing outer boundaries of the coppice corridors which extend in the longitudinal direction of the coppice strips (i.e. between the outer boundaries of the coppice corridors which are respectively located closest to the permanent forest strip).

The shortest distances between adjacent coppice corridors can vary depending on the coppice tree species. According to one embodiment the shortest distances between adjacent coppice corridors are in a range of 3 to 10.6 m, preferably in a range of 3.5 to 9.6 m, in particular in a range of 5 to 8 m.

The coppice strip width (WC) is the mean width of the coppice corridor plus half the mean distance from each of the outer boundaries of the coppice corridor, which extend in the longitudinal direction of the coppice strip, to the respectively nearest outer boundaries of the adjacent permanent forest corridors, which extend in the longitudinal direction of the permanent forest strips. In other words, the width of a coppice strip (WC) arranged between a first and a second permanent forest strip results from the averaged width of the coppice corridor plus the averaged half distance from the first outer boundary of the coppice corridor (e.g. located to the left of it in the longitudinal direction) to the outer boundary of the adjacent first permanent forest corridor (also located to the left of it in the longitudinal direction) closest to the said first outer boundary of the coppice corridor and the averaged half distance from the second outer boundary of the coppice corridor (e.g. located to the right of it in the longitudinal direction) to the outer boundary of the adjacent second permanent forest corridor (also located to the right of it in the longitudinal direction) closest to the said second outer boundary of the coppice corridor.

According to one embodiment, the width of the coppice strip (WC) is 2.25 to 9 m, preferably 2.25 to 8 m.

In case the permanent forest strips are established after the coppice strips, the shortest distance between adjacent coppice corridors is preferably greater than 8 m. Alternatively, the establishment of the permanent forest strips can take place in the year after harvesting of the coppice trees of the coppice strips, since in this way no or only little shade is produced at the time of establishment of the permanent forest strips by the coppice stump shoots that have not yet sprouted again.

According to one embodiment, when establishing the coppice strip, the coppice trees are planted in at least two rows of trees, preferably in at least three rows of trees, so that there is a certain distance between the rows of seedlings, cuttings or saplings. For example, when establishing the coppice strips, 2 to 10 rows of coppice trees are planted for each coppice strip, preferably 2 to 4, in particular 2 to 3.

The seed stock in the coppice strip is preferably distributed with a certain row spacing. In an exemplary embodiment, the row spacing (e.g. distance) between two adjacent rows of coppice trees in a coppice strip is 0.4 to 5.0 m, preferably 2.40 to 3.20 m. In addition, the individual rows can also be cultivated in form of double rows, wherein the distance (e.g. spacing) between a double row and the adjacent rows of coppice trees in a coppice strip (or the adjacent double rows of coppice trees in a coppice strip) is preferably 2 to 5 m, based on the distance between the double row center of the double row and the adjacent row, or based on the distance between the double row center of the double row and the double row center of the adjacent double row.

In the context of the present disclosure the term "double row" with respect to rows of coppice trees in the coppice strip relates to two rows of coppice trees that are significantly closer to each other than to the respective adjacent rows (or adjacent double rows) of coppice trees in the coppice strip. Preferably, the distance within a double row is at most half the distance to an adjacent row or an adjacent double row. For example, the row spacing (e.g. distance) between the two rows of coppice trees in the double row is 0.4 to 1 m, while the row spacing (e.g. distance) between the double row and the adjacent rows (or adjacent double row) of coppice trees in the coppice strip is 2 to 5 m, based on the double row center of the double row and the adjacent row, or based on the double row center of the double row and the double row center of the adjacent double row.

The row spacing of two coppice tree rows can deviate from the main planting axis by +/−0.30 m for an observation length of 10 m, preferably by no more than +/−0.15 m. FIG. 1 numeral 2 shows the deviation of the row spacing of two coppice tree rows.

According to one embodiment the spacing of the coppice trees within a row (i.e. in the longitudinal direction) of coppice trees in the coppice strip is 0.20 to 1.5 m, preferably 0.30 to 1 m, in particular 0.30 to 0.50 m. However, the spacing of coppice trees within a row of coppice trees may also vary and be at least partly larger than the aforementioned spacing, especially when groups of coppice trees are formed.

According to one embodiment, the total length of a row of coppice trees in the coppice strip is at least 20 m, preferably at least 50 m, in particular at least 100 m, for example, the total length of a row of coppice trees in the coppice strip may be in a range from 20 to 1,000 m, preferably in a range from 50 to 500 m, in particular in a range from 50 to 250 m.

According to one embodiment at least 50 coppice trees are planted within a row of coppice trees in the coppice strip, preferably at least 100, in particular at least 150.

According to one embodiment the planting density of coppice trees when establishing the coppice-with-standard is 1,500 to 10,000 pc./ha (pieces/hectare), preferably 2,000 to 6,000 pc./ha, in particular 2,500 to 5,000 pc./ha, based on the total area of the coppice-with-standard.

The relatively high land occupancy combined with the rapid growth of coppice trees results in high leaf litter and fine root production, which has a positive effect on the permanent humus build-up.

According to one embodiment the spacing of coppice trees within a row of coppice trees in a coppice strip is 0.4 m and the row spacing between two adjacent rows of coppice trees in the coppice strip is 2.4 m. According to a further embodiment the spacing of coppice trees within a row of coppice trees in a coppice strip is 0.5 m and the row spacing between two adjacent rows of coppice trees in the coppice strip is 2.8 m.

According to a further embodiment the spacing of coppice trees within a row of coppice trees in a coppice strip is 0.4 m and the row spacing between two adjacent rows of coppice trees in the coppice strip is 3.0 m.

Preferably, coppice tree species are characterized by rapid growth, stump shoots, and easy litter decomposition and in that a lot of litter and fine roots are formed after a short time. Preferably, the coppice tree species used do not show basal shoot and can be planted by means of saplings.

According to one embodiment deciduous trees are used as coppice trees for stock establishment, which form relatively fast high amounts of foliage and fine roots, have an easily decomposable litter, are capable of stump shoots and preferably do not form basal shoots, such as the tree species poplar (*Populus* spec. with the exception of poplars from the genus and leuce/white or trembling poplars, also known as aspens), willow (*Salix* spec.), rowan (*Sorbus aucuparia*), birch (*Betula* spec.), elder (*Sambucus* spec.), laburnum (*Laburnum* spec.) and preferably for tropical and subtropical growing areas tree species such as purging nut (*Jatropha curcas*), acacia (*Acazia* spec.), albizia (*Alabizia* spec.), white-headed mimosa (*Leucaena* spec.) and paper mulberry (*Morus papyrifera*).

Tree species having particular high wood growth rates and further tend to basal shoot are aspen (poplar from the genus leuce/white or trembling poplar, e.g. *Populus alba, Populus tremula, Populus tremuloides*), alder (*Alnus* spec.), sweet chestnut (*Castanea* spec.) and tree species that are foreign to Germany and considered invasive, such as robinia (*Robinia* spec), paulownia (*Paulownia* spec.), ash-maple (*Acer negundo*), tree-of-god (*Ailanthus altissima*), red ash (*Fraxinus pennsylvanica*), late blossoming cherry (*Prunus serotina*), eucalyptus (*Eucalyptus* spec.), gleditia (*Gleditsia triacanthos*) and vinegar tree (*Rhus typhina*). However, these tree species, which are prone to basal shoot, are not suitable for establishing the coppice strip and are not understood as coppice tree species in the context of the present disclosure.

The reason being that the basal shoot tree species can spread from the coppice strip into the permanent forest strip and the root saplings of the "basal shoot tree species" dominate and suppress the young permanent forest trees.

In the context of the present disclosure, the term "basal shoot" means the propagation of a tree species by root suckers within a radius of 1 to 5 meters from the injured or uninjured main tree, with at least five root suckers per year growing from each main tree within this radius.

It is preferable to establish the coppice trees by means of saplings or seeds. Poplars (without aspen), willows and elder can be established, in particular, with saplings. Birch, rowan and laburnum can be established, in particular, by sowing. Alternatively, the tree species birch, rowan, elder and laburnum can be established relatively easily and cheaply using rooted cuttings. The establishment with poplars and willows is particularly preferred, as these tree species (i) can be established via saplings, (ii) grow quickly and can be cultivated in short rotation, (iii) are not susceptible to disease, (iv) do not form basal shoots, (v) form a lot of medium-rapidly decomposable litter and (vi) form a high proportion of fine roots.

The willow tree also provides the first food after winter for bees and bumblebees due to the early spring flowering and is thus also a benefit for the above-ground fauna.

According to one embodiment fast-growing tree species with short rotation cultivation are planted when establishing the coppice strip. Fast-growing tree species with short rotation cultivation are characterized by a wood mass yield of more than 6 tonnes/(hectare*year) dry mass during the second rotation period (i.e. the period between the first and the second rotation, e.g. 5 to 9 years after stock establishment) with a acre-value (from the German term "Ackerzahl") of the soil of at least 50 and an annual precipitation of at least 600 mm, as well as a planting number of 10,000 pieces per hectare with respect to the coppice strips when establishing the stock. Preferably, the dry matter wood yield is 8 tons/(hectare*year) or more. Poplar and willow have a particularly high wood mass yield. The wood mass yield of coppice trees or fast-growing tree species with short rotation cultivation is preferably higher than or at least equal to that of permanent forest trees within the first 10 years after stock establishment.

The fast-growing tree species with short rotation cultivation form a relatively large amount of foliage and fine root mass within a short period after stock establishment. Preferably, the dry matter content of the leaf litter (of the fast-growing tree species) at the end of the second rotation period within the coppice strip is 2 to 7 tons/ha, preferably 3 to 5 tons/ha, and the dry matter content of the dead fine root dry matter or root litter is 60 to 95% of the leaf dry mass.

For the tree species poplar, poplar and poplar hybrids from the genus *Aigeiros* or black poplar, such as *Populus nigra, Populus deltoides, Tacamahaca* or balsam poplars, such as *Populus trichocarpa, Populus maximowicii* can be planted. This also includes poplar clones or hybrids such as Max 1, Max 3, Max 4, Max 5, Hybrid 275, Matrix 11, Matrix 24, Matrix 49, Muhle Larsen, Fritzy Pauly, Androscoggin, Pannonia, Oxford, Rochester, AF2 and AF6. The poplar and poplar hybrids can be used as single origin varieties, but also mixed with other poplar varieties and other tree species.

For the tree species willow, willow and willow hybrids of e.g. *Salix viminalis* (basket willow), *Salix pupurea* (purple willow), *Salix cinerea* (grey willow), *Salix caprea* (goat willow), *Salix daphnoides* (European violet willow), *Salix alba* (white willow), *Salix schwerinii* (narrow-leav willow), *Salix dasyclados* (felt willow), *Salix rubens* (crack willow) or *Salix triandra* (almond willow) can be planted. This also includes willow clones or willow hybrids such as Jorr, Tora, Sven, Zieverich, Olof, Gudrun, Tordis, Inger, Schwedenklon 683, DA 50, DA 92 and DA 176. The willow varieties and hybrids can be used as single origin varieties but also mixed with other willow varieties and/or other tree species, especially poplars.

Willows tend to have very bushy shoots after pruning or sawing, or a large number of new shoots per trunk. The variety Olof (*Salix viminalis*×(*Salix viminalis*×*Salix schwerinii*)) on the other hand shows only a few new shoots after pruning and is therefore particularly suitable for mixing with poplars, as all the poplars also show few new shoots after pruning.

The coppice strips may be established with a single coppice tree species, such as poplar. The coppice strips may be established with two or more coppice tree species, in particular if the area of the acre is more than 3 ha, in particular if the area of the acre is more than 5 ha or more than 10 ha or more than 20 ha. Several tree species form more stable stocks and avoid monoculture problems.

According to one embodiment at least two different coppice tree species are planted when establishing the coppice strip.

Poplars, willows, elders or laburnum may preferably be planted as a mixture of tree species within the coppice strips, as thereby use can be made of leaf litter decomposition rates with different speeds and increased species diversity.

According to one embodiment at least two different coppice tree species selected from the group consisting of poplar, willow, elder, or laburnum are planted when establishing the coppice strip.

A mixture of tree species is present if at least two different tree species occur in a number that accounts for at least 10% of the total number of trees considered, preferably at least 25%, in particular at least 30%. The type and way of mixing tree species is flexible. For example, a coppice strip can be established with 100% poplar and the adjacent coppice strip with 100% willow or elder. There can also be a mixture of two coppice tree species within a coppice strip. For example, within a coppice strip, one row can be 100% poplar and another row 100% willow or elder. Alternatively, tree species can also be mixed within a row in the coppice strip.

Stock establishment is preferably carried out with coppice tree species that have a fast or medium decomposition rate of the foliage, as this ensures an even supply of nutrients to the soil organisms between two leaf fall periods. The decomposition rate of the leaf litter of elder is very fast, the decomposition rate of the leaf litter of laburnum is fast, and the decomposition rate of the leaf litter of poplar, willow, birch and rowan is medium fast.

In the case of deciduous trees, the leaves fall to the ground every year in autumn; in the case of evergreen trees, such as conifers, the leaves or needles fall throughout the entire year. Depending on the tree species and the size of the crown-canopy up to 7 tons of dry matter of leaves can fall to the ground per year. Therefore, it is particularly preferable for the coppice strips of the coppice-with-standard to be wider than the permanent forest strips because the coppice strip provides a lot of easily decomposable dry matter in leaf litter early on, while the permanent forest trees still have a small crown-canopy. The coppice trees act as pioneers in terms of humification. As soon as the leaves or needles fall from the tree they are called litter. In trees, minerals are concentrated in the foliage and bark. The stem wood contains hardly any minerals. Compared to conventional green plants (with short roots) foliage contains particularly large amounts of highly concentrated minerals, such as potassium, calcium, magnesium and phosphorus, because trees can generate the nutrients from deeper soil layers via far-reaching root systems. In contrast to the other side vegetation of the initial afforestation area, foliage is already slightly colonized with decomposition-promoting bacteria and fungi before the leaves fall, which promote humification. With increasing lying time, the number of decomposition-promoting bacteria and fungi in the litter increases rapidly, so that the litter serves as "food" for the soil organisms. However, there are tree species-related differences in the chemical composition of the litter. There are tree species with easily decomposable litter, tree species with moderately decomposable litter, and tree species with poorly decomposable litter. A litter that is easily decomposable to moderately decomposable is preferred. Litter decomposition depends on the chemical ratio of carbon to nitrogen. The lower the ratio, the easier and faster the litter can be metabolized by soil organisms. The metabolic products are, on the one hand, taken up again by the tree as nutrients and, on the other hand, stored in the soil as long-term permanent humus.

Permanent Forest Strips

In the permanent forest strip, mainly permanent forest tree species are planted which are harvested after a rotation period of more than 20 years, preferably more than 40 years, in particular more than 60 years. The harvested permanent forest trees are preferably used as timber or furniture wood. The permanent forest trees in the permanent forest strip form the overwood of the coppice-with-standard. The harvest diameter at breast height (DBH) of a permanent-forest-target tree is preferably greater than 30 cm, more preferably greater than 45 cm, in particular greater than 60 cm.

The establishment of the coppice-with-standard is done in an optimized and systematic way, such that the spacing of the permanent forest strips takes into account the later overwood-target distance from the beginning. More trees than necessary are planted in the permanent forest strip to compensate for loss, to ensure selection by individual removal, and to generate sufficient shade to darken-out the coppice trees. The overwood-target distance is, for example, 4 to 11 m.

Geometrically, a permanent forest strip is defined by the length as well as the width of the permanent forest strips and the "coppice corridors" within.

In the context of the present disclosure the term "permanent forest corridor" or "habitation corridor of the permanent forest strip" means a corridor in the form of a strip (or a delimited territory with an elongated layout) within the permanent forest strip with straight-line outer boundaries extending along the longitudinal direction of the permanent forest strip.

In case that the planting of permanent forest trees when establishing the permanent forest strip is carried out in rows extending substantially along the oblong extension direction of the permanent forest strip (for example if the permanent forest trees when establishing the permanent forest strip are planted at regular intervals in one or more rows extending substantially along the oblong extension direction of the permanent forest strip, so that continuous rows of permanent forest trees or groups of permanent forest trees are formed) the habitation corridor comprises 100% of the permanent forest trees planted when establishing the permanent forest strip.

In this definition of the permanent forest corridor, the habitation corridor of the permanent forest strip extends between the respective outermost rows of permanent forest trees (or between the two outer rows of permanent forest trees).

In case that the planting of permanent forest trees when establishing permanent forest strip is not exclusively in rows extending substantially along the oblong extension direction of the permanent forest strip (e.g. if the permanent forest trees are planted irregularly when establishing the permanent forest strip, or both in rows and irregularly), the habitation corridor comprises at least 75% of the permanent forest trees planted when establishing permanent forest strip, wherein the habitation corridor is selected in such a way that the width of the habitation corridor is as narrow as possible. In this definition of the permanent forest corridor, isolated coppice trees located at the edge of the permanent forest strip (so-called runaways) are not considered when determining the habitation corridor.

According to one embodiment, the width of the permanent forest corridors is 0 to 6.5 m, preferably 0 to 6 m, in particular 0 to 3 m. The width of the permanent forest corridors is indicated, for example, in the figures with the numeral 11.

In this context, it should be noted that, in the case where the coppice-with-standard is established with single-row permanent-forest strips (as shown, for example, in FIGS. 1, 2, 4, 7 and 9), the width of the permanent forest corridors is 0 m.

Another important characteristic of the coppice-with-standard concerns the distances between the permanent forest corridors, in particular the shortest distances between the corridor-outer-boundaries of adjacent permanent forest corridors. The shortest distance of the corridor-outer-boundaries of adjacent permanent-forest corridors is defined as "the shortest distance of adjacent permanent forest corridors".

In the context of the present disclosure the term "shortest distance between adjacent permanent-forest corridors" relates to the shortest distance between the permanent-forest corridors of two permanent-forest strips immediately adjacent to a coppice strip, wherein the distance between the permanent forest corridors of two permanent forest strips immediately adjacent to a coppice (i.e. the distance between the permanent forest corridors of two permanent forest strips which, together with a coppice strip, form the sequence permanent forest strip-coppice strip-permanent forest strip) is determined by the mean distance between two opposing outer boundaries of the permanent forest corridors which extend in the longitudinal direction of the permanent forest strips (i.e. between the outer boundaries of the permanent forest corridors which are respectively located closest to the coppice strip).

The shortest distances between adjacent permanent forest corridors vary, depending on the permanent forest tree species, between 4 and 11 m, preferably between 4 and 10 m, more preferably between 6 and 10 m, still more preferably between 8 and 10 m, in particular between 9 and 10 meters. With these shortest distances between adjacent permanent forest corridors, on the one hand an optimal thickness growth-time ratio of the permanent forest trees can be achieved and, on the other hand, sufficient shading by the crown-canopy of the permanent forest trees can also take place within 20 to 35 years, so that the intermediate coppice trees are pushed due to by lack of light.

With a shortest distance of adjacent permanent forest corridors of more than 11 m, darkening-out of coppice trees within 20 to 35 years is not possible.

In the context of the present disclosure, the term "darkening-out" refers to providing at least 50% shade in a coppice strip, wherein the shade is produced by the crown-canopy of permanent forest trees located in two permanent forest strips immediately adjacent to the shaded coppice strip.

Furthermore, with a shortest distance between adjacent permanent forest corridors of more than 11 m it is not possible to establish a functioning subterranean mycorrhiza network between the permanent forest trees within 20 to 35 years after the stock establishment, which is important for the long-term stability of the forest.

The permanent forest strip width (WPF) is the mean width of the permanent forest corridor plus half the mean distance from each of the outer boundaries of the permanent forest corridor, which extends in the longitudinal direction of the permanent-forest strip, to the respectively nearest outer boundaries of the adjacent coppice corridors, which extend in the longitudinal direction of the coppice strips. In other words, the width of a permanent forest strip (WPF) arranged between a first and a second coppice strip results from the averaged width of the permanent forest corridor plus the averaged half distance from the first outer boundary of the permanent forest corridor (e.g. located to the left of it in the longitudinal direction) to the outer boundary of the adjacent first coppice corridor (also located to the left of it in the longitudinal direction) closest to the said first outer boundary of the permanent forest corridor and the averaged half distance from the second outer boundary of the permanent forest corridor (e.g. located to the right of it in the longitudinal direction) to the outer boundary of the adjacent second coppice corridor (also located to the right of it in the longitudinal direction) closest to the said second outer boundary of the permanent forest corridor.

According to one embodiment, the permanent forest strip width (WPF) is 1.75 to 8 m, preferably 1.75 to 7 m.

When establishing the permanent forest strip, the permanent forest trees may be planted in rows extending substantially along the oblong extension direction of the permanent forest strip (for example, the permanent forest trees can be planted at regular intervals in one or more rows extending substantially along the oblong extension direction of the permanent forest strip when establishing the permanent forest strip, so that continuous rows of permanent forest trees or groups of permanent forest trees are formed). However, the permanent forest trees may also be planted irregularly or planted both in rows and irregularly when establishing the permanent forest strip.

According to one embodiment the shortest distances (e.g. spacings) of the permanent forest trees within a row of permanent forest trees in a permanent forest strip is 0.5 to 11 m, preferably 1 to 8 m. The shortest distances (e.g. spacings) of the permanent forest trees within a row of permanent forest trees can vary. In this way it is possible to form groups of permanent forest trees.

Figure 2:
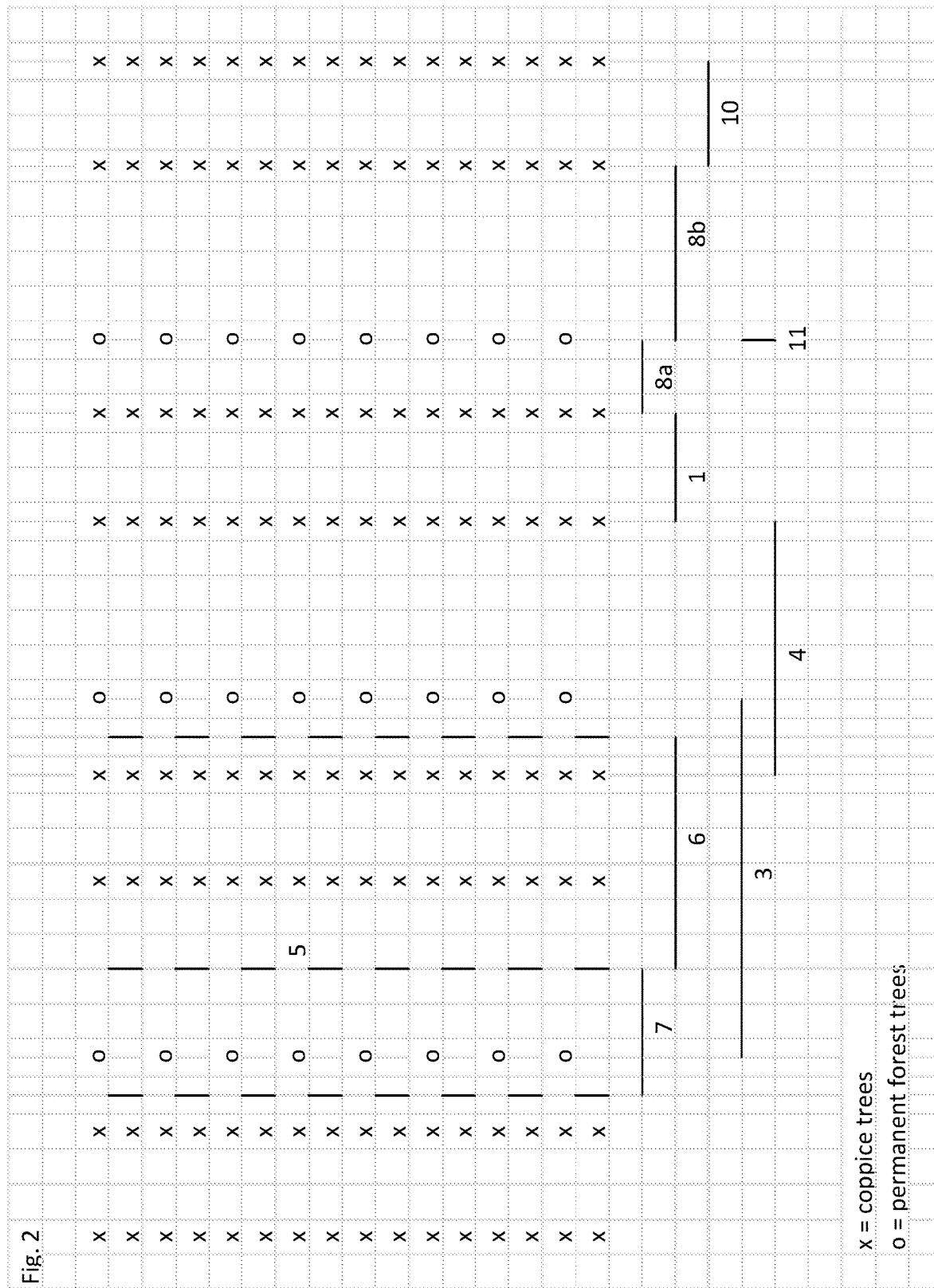
FIG. 2 shows a coppice-with-standard consisting of single-row permanent forest strips alternating with double-row coppice strips. Numeral 3 shows the shortest distance between adjacent permanent forest corridors (o . . . o). Numeral 4 shows the shortest distance between adjacent coppice corridors (x . . . x). Numeral 5 shows the half distance of a permanent forest row from the immediately adjacent coppice row. Numeral 6 shows the coppice strip width (WC). Numeral 7 shows the permanent forest strip width (WPF). Numerals 8a and 8b show the outer-boundary-distance between a permanent forest corridor and an immediately adjacent coppice corridor. Numeral 1 shows the row spacing of coppice rows within a coppice strip. Numeral 10 shows the coppice corridor width and numeral 11 shows the permanent forest corridor width.
Figure 5:
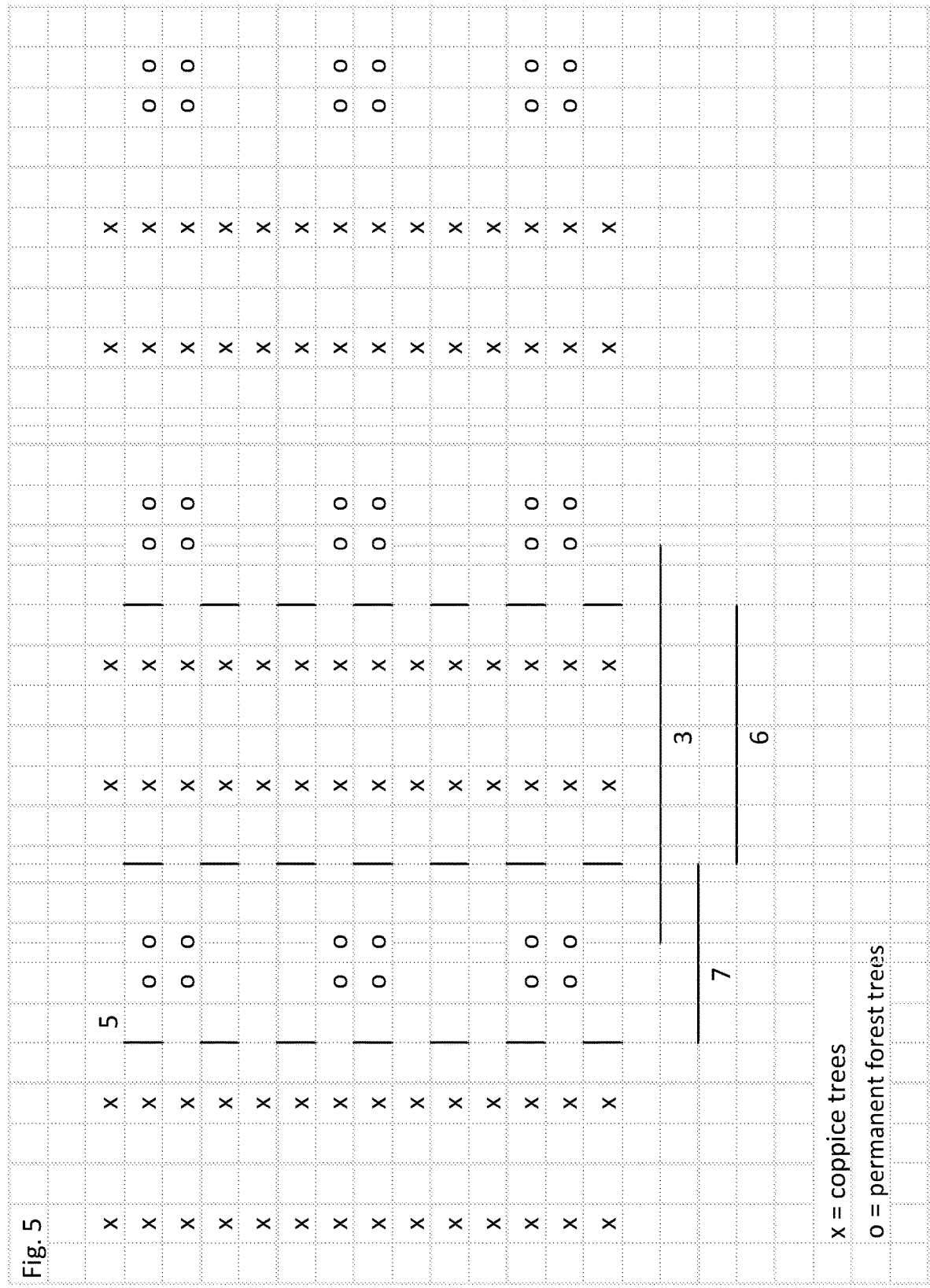
FIG. 5 shows a coppice-with-standard consisting of double-row permanent forest strips with grouped permanent forest trees alternating with double-row coppice strips. Numeral 3 shows the shortest distance between adjacent permanent forest corridors (o . . . o). Numeral 5 shows the half distance of a permanent forest row from the immediately adjacent coppice row. Numeral 6 shows the coppice strip width (WC). Numeral 7 shows the permanent forest strip width (WPF).
Figure 6:
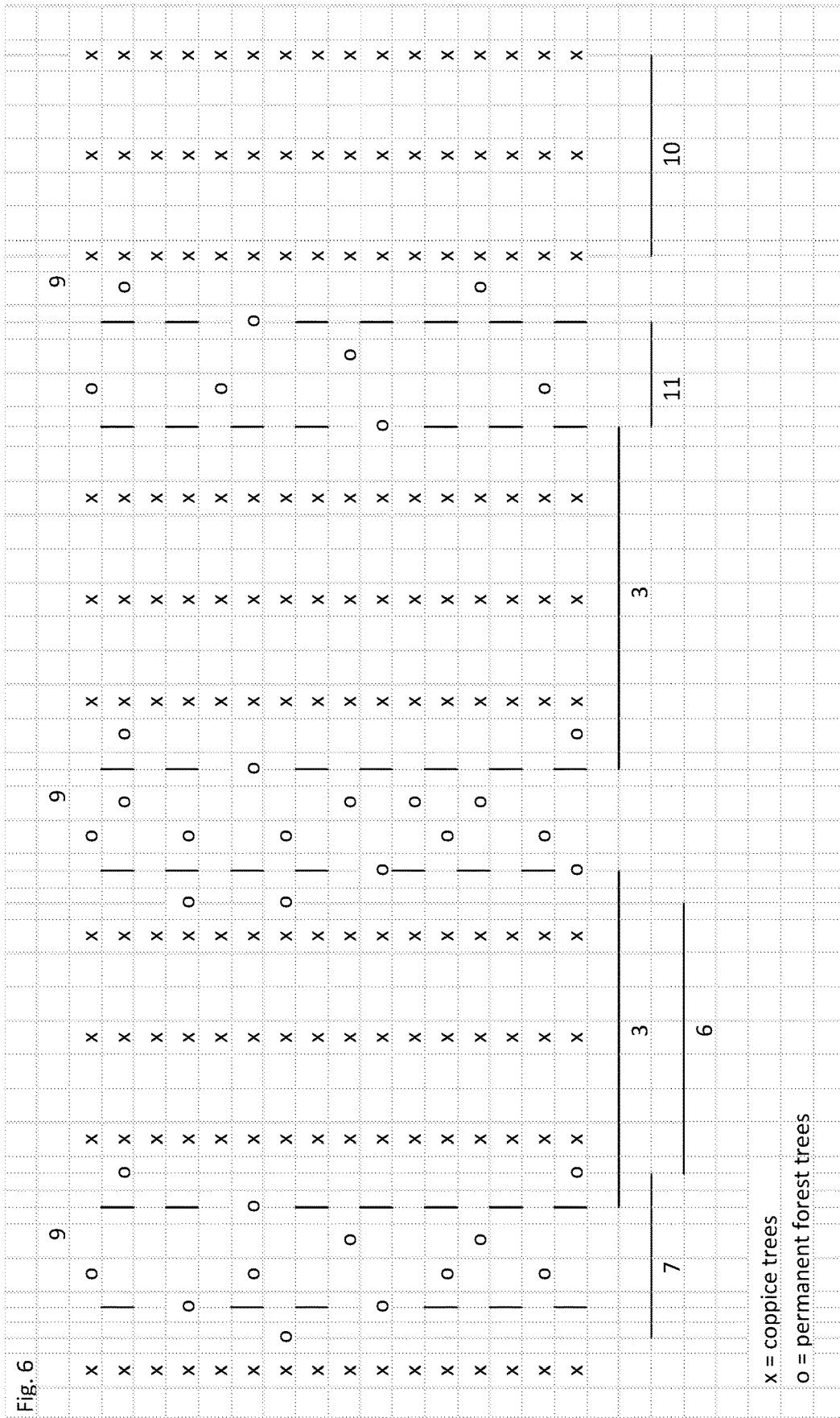
FIG. 6 shows a coppice-with-standard consisting of irregularly cultivated permanent forest strips alternating with triple-row coppice strips. Numeral 3 shows the shortest distance between adjacent permanent forest corridors (o . . . o). Numeral 6 shows the coppice strip width (WC). Numeral 7 shows the permanent forest strip width (WPF). Numeral 9 shows the 75% permanent forest corridor with runaway-elimination. Numeral 10 shows the width of the coppice corridor and numeral 11 shows the width of the permanent forest corridor.

As shown in FIG. 1 and FIG. 2, a uniform distribution of the permanent forest trees in a row of permanent forest trees in a permanent forest strip can be realized, so that the permanent forest trees within a row of permanent forest trees in a permanent forest strip have a shortest distance (e.g. spacing) of 1 to 3 m. However, it is also possible to vary the shortest distance (e.g. spacing) of the permanent forest trees within a row of permanent forest trees so that groups of permanent forest trees are formed. As shown in FIG. 5, the spacing of the permanent forest trees within a row of permanent forest trees can vary so that groups of permanent forest trees are formed every 4 to 11 meters.

Figure 3:
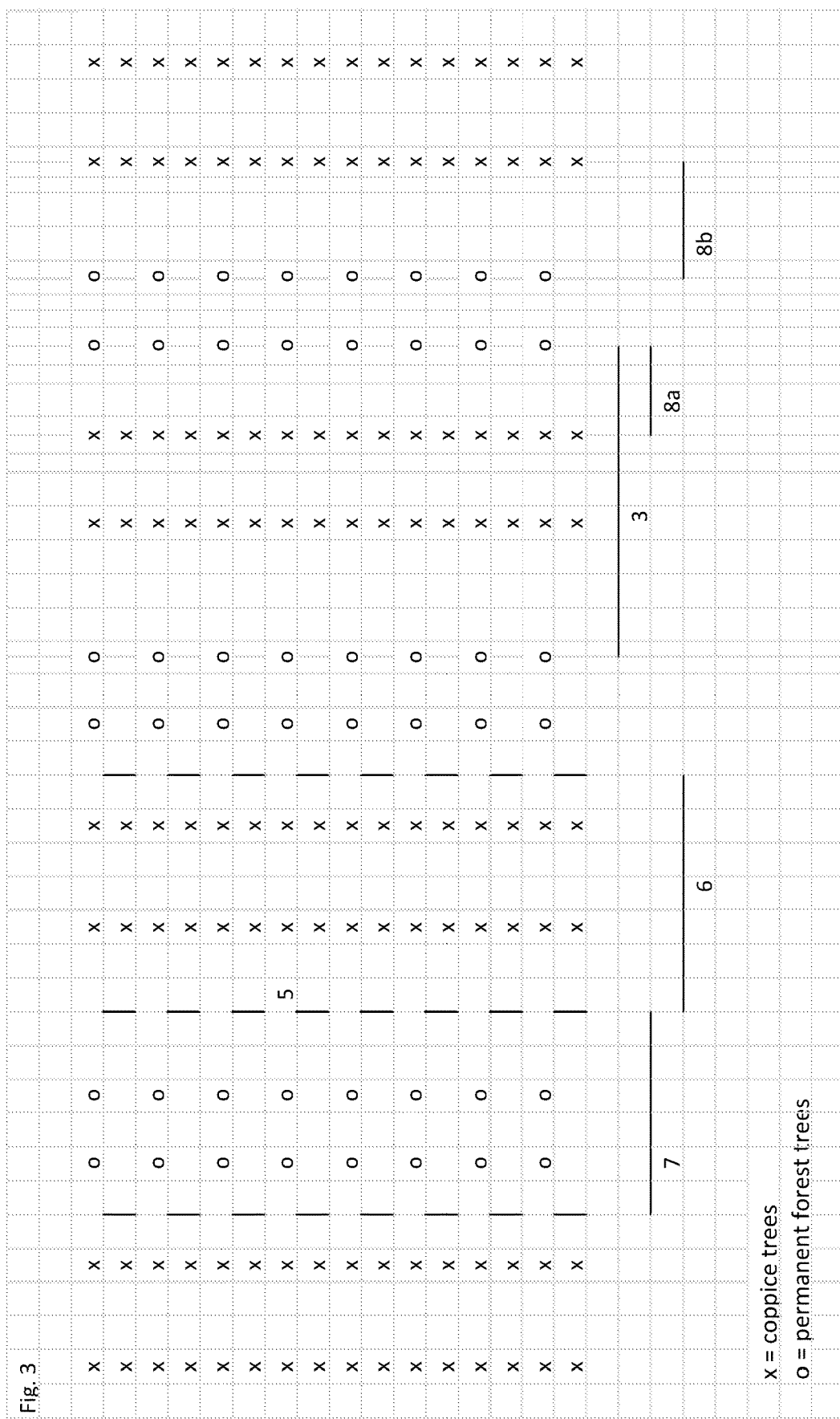
FIG. 3 shows a coppice-with-standard consisting of double-row permanent forest strips alternating with double-row coppice strips. Numeral 3 shows the shortest distance between adjacent permanent forest corridors (o . . . o). Numeral 6 shows the coppice strip width (WC). Numeral 7 shows the permanent forest strip width (WPF). Numerals 8a and 8b show the outer-boundary-distance between a permanent forest corridor and an immediately adjacent coppice corridor.
Figure 4:
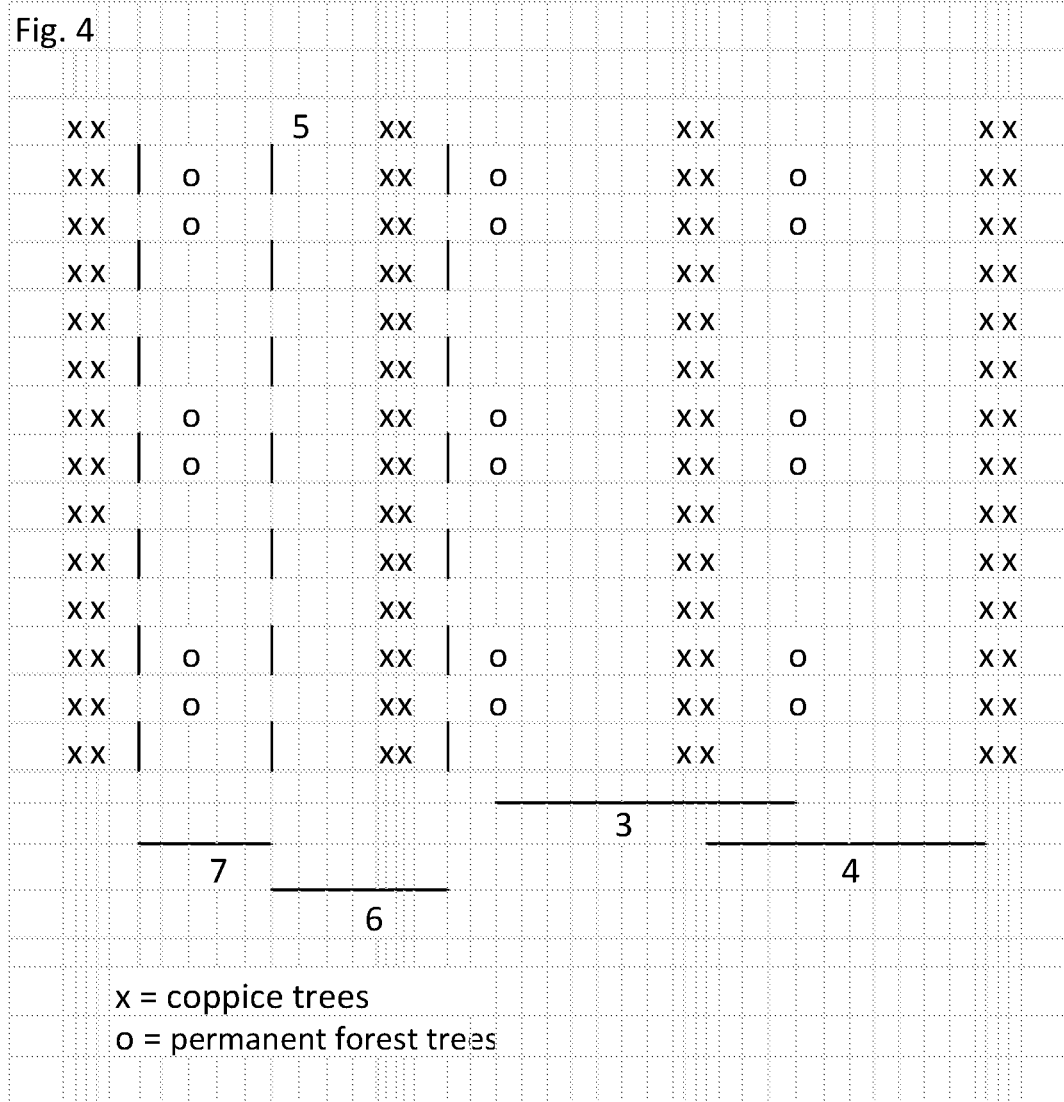
FIG. 4 shows a coppice-with-standard consisting of single-row permanent forest strips alternating with double-row coppice strips. Numeral 3 shows the shortest distance between adjacent permanent forest corridors (o . . . o). Numeral 4 shows the shortest distance between adjacent coppice corridors (x . . . x). Numeral 5 shows the half distance of a permanent forest row from the adjacent coppice rows. Numeral 6 shows the coppice strip width (WC). Numeral 7 shows the permanent forest strip width (WPF).

It is preferable to establish the permanent forest trees in a row of trees, because this allows an even darkening-out of the coppice trees at a later stage (e.g. 20 to 35 years after establishment of the described coppice-with-standard). A permanent forest strip may consist of a single row of permanent forest trees (FIG. 1 and FIG. 2) or of several rows of permanent forest trees which are planted next to each other (FIG. 3).

According to one embodiment the planting density of the permanent forest trees when establishing the coppice-with-standard is 150 to 3,000 pc./ha (pieces/hectare), preferably 300 to 2,000 pc./ha, in particular 400 to 1,000 pc./ha, based on the total area of the coppice-with-standard.

The planting density of the permanent forest trees is preferably low in relation to the total area of the coppice-with-standard, e.g. 400 to 1,000 pc./ha, since on the one hand individual protection for the freshly planted permanent forest trees against sweeping or browsing by game is economically affordable and, on the other hand, there are still enough overwood-target-trees or overwood-selection-trees available to obtain later (e.g. after 80 years), especially straight-growing permanent forest trees.

According to one embodiment, the length of a row of permanent forest trees in the permanent forest strip is at least 20 m, preferably at least 50 m, in particular at least 100 m, for example, the length of a row of coppice trees in the coppice forest strip may be in a range of 20 to 1,000 m, preferably in a range of 50 to 500 m, in particular in a range of 50 to 250 m.

To establish a permanent forest strip, at least one permanent forest tree species is planted. According to one embodiment only permanent forest tree species are planted when establishing a permanent forest strip. However, permanent forest tree species can also be planted together with coppice tree species when establishing a permanent forest strip, even if this is not a particularly preferred embodiment. However, the exclusive planting of coppice tree species when establishing a permanent forest strip is excluded.

Under the general conditions just mentioned, all existing tree and shrub species can in principle be planted when establishing a permanent forest strip, if at least one permanent forest tree species is present.

In the context of the present disclosure the term "permanent forest tree species" refers to tree species within the permanent forest strips that remain as overwood in the permanent forest strip after the end of the coppice cultivation (e.g. 20 to 35 years after stock establishment). The crown diameter of the permanent forest trees must be of such a size that, at an adult age, a crown-closure of permanent forest trees of adjacent permanent forest strips is possible.

In the context of the present disclosure the term "adult age" refers to a tree that has a diameter at breast height DBH of at least 30 cm or a tree that has an age of at least 40 years.

A diameter at breast height (DBH) of 30 cm may, for example, already be reached 20 years after stock establishment. Thus, the adult age can already be reached 20 years after stock establishment.

In particular slender tree species with relatively large crown diameters can have a lower DBH than 30 cm in their "adult age" and still be suitable for generating a crown-closure of adjacent permanent forest strips, in particular if the shortest distance between adjacent permanent forest corridors is small, e.g. 4 to 6 m. Slender tree species with a relatively large crown-canopy are, e.g., pear tree, hazelnut tree, apple tree or rowan tree.

The establishment of the permanent forest strips can be done with a single permanent forest tree species. The establishment of the permanent forest strips can also be done with two or more permanent forest tree species, in particular if the area of the acre is more than 3 ha, especially if the area of the acre is more than 5 ha or more than 10 ha or more than 20 ha. Several tree species form more stable stocks and avoid monoculture problems.

According to one embodiment at least two different permanent forest tree species are planted when establishing the permanent forest strip.

Permanent forest tree species are, for example, maple (*Acer* spec.), horse chestnut (*Aesculus hippocastanum*), alder (*Alnus* spec.), birch (*Betula* spec.), hornbeam (*Carpinus* spec.), hickory (*Carya* spec.), sweet chestnut (*Castania* spec.), hazel/tree hazel (*Corylus* spec.), beech (*Fagus* spec.), ash (*Fraxinus* spec.), walnut (*Juglans* spec.), tulip trees (*Liriodentron* spec), apple trees (*Malus* spec.), plane tree (*Platanus* spec.), cherry (*Prunus* spec.), pear (*Pyrus* spec.), oak (*Quercus* spec.), mountain ash/service tree/sorb tree (*Sorbus* spec.), lime (*Tilia* spec), elm (*Ulmus* spec.), robinia (*Robinia* spec.), Amur cork tree (*Phellodendron amurense*), amber tree (*Liquidamber* spec.), leather pod trees (*Gledisia* spec.), trumpet trees (*Catalpa* spec.) camphor tree (*Cinnamomum camphora*), gum elm (*Eucommia ulmoides*) tree magnolia (*Magnolia kobus*), bamboo (Bambusoideae with the subspecies Arundinarieae, Bambuseae and Olyreae, e.g. Moso bamboo=*Phyllostachys edulis*), Gliricidia (*Gliricidia sepium*), conifers (*Abies* spec., *Cedrus* spec., *Calocedrus* spec., *Chamaecyparis* spec., *Cupressocyparis* spec, *Ginkgo biloba*, *Juniperus* spec., *Larix* spec., *Metasequoia glyptostroboides*, *Pinus* spec., *Picea* spec, *Pseudotsuga* spec., *Sequoiadendron* spec., *Taxus* spec., *Thuja* spec., *Tsuga* spec).

Under certain circumstances, coppice tree species can also be planted in the permanent forest strip when establishing the stock. In particular birch, since birch is a good coppice tree species as well as a good permanent forest tree species.

In addition to the coppice tree species, e.g. birch, there are at least one or two other tree species present in the permanent forest strips that do not belong to the group of coppice tree species, e.g., one or more tree species from the group of permanent forest tree species. In general, at least one tree species is planted in the permanent forest strip that does not belong to the coppice tree species, e.g., one or more permanent forest tree species.

When establishing the permanent forest strip permanent forest tree species with an easily decomposable litter or a moderately decomposable litter are preferably planted, at least in part. According to one embodiment at least 33%, preferably at least 50%, of the permanent forest trees planted when establishing the permanent forest strip have easily decomposable litter or moderately decomposable litter, based on the total number of permanent forest trees planted. Tree species with an easily decomposable litter are, for example, robinia, alder, elm, ash, elder, poplar and aspen, willow, maple, rowan, pear, apple. Tree species with a moderately decomposable litter are, for example, cherry, mountain ash, service tree, hazel and tree hazel, birch, lime and hornbeam.

When establishing the permanent forest strip, permanent forest tree species with a litter that is difficult to decompose are preferably planted in a minority in relation to permanent forest tree species with a litter that is easily decomposable or a litter that is moderately decomposable. According to one embodiment less than 50%, preferably less than 34%, of the permanent forest trees planted when establishing the permanent forest strip have a litter that is difficult to decompose, relative to the total number of permanent forest trees planted. Tree species with a litter that is difficult to decompose are, e.g., conifers, oak, beech, walnut, sweet chestnut, horse chestnut and plane tree.

Another important point in relation to subterranean silviculture is the activity of the ecto- and endomycorrhizal fungi living in symbiosis with the tree roots. The symbiotic fungi settle on the fine roots of the trees and extend the roots via the filamentous fungal hyphae. This quasi-extended root system can extract more water and trace elements from the soil and make them available to the tree for the purpose of photosynthesis. In return, the fungus receives nutrients from the tree in the form of sugar originating from photosynthesis. The fungi receive up to 25% of the trees sugar production. The fungus also provides the tree with a subterrane information system that warns the tree of pests, for example. Furthermore, the subterrane interconnected fungal network serves as a nutrient transport system from tree to tree. In this manner, small trees can survive and grow contributing to the total stock even without an adequate supply of light because of the support of the surrounding large trees. However, the fine roots including symbiotic fungi consistently die and are also formed anew. The dead fine roots are also converted back into nutrients for the tree and into permanent humus. Therefore, the most active or strongest endo- or ectomycorrhiza formation is preferred. For the long-term functioning of the root-fungal symbiosis it is essential that, in particular the permanent forest trees are at a shortest distance of 4 to 11 m from each other after, e.g., 30 to 40 years and not further apart. When establishing the permanent forest strip, it is preferable to plant mainly permanent forest tree species that have a medium to high tendency to form endo- or ectomycorrhiza.

According to one embodiment less than 34%, preferably less than 25%, of the permanent forest trees planted when establishing the permanent forest strip have a low tendency to form endo- or ectomycorrhiza.

A low tendency for the formation of mycorrhiza is shown, for example, by the permanent forest tree species robinia, horse chestnut, and walnut. Most other tree species have a medium to strong tendency to form mycorrhiza and can therefore be planted without restriction. Conifers, birch, beech, tree hazel and oak, for example, show a particularly strong tendency to form mycorrhiza.

When establishing the permanent forest strip permanent forest tree species with the ability to stump shoots are preferably planted at least in part. According to one embodiment at least 50%, preferably at least 75%, of the permanent forest trees planted when establishing the permanent forest strip have the ability to stump shoots, based on the total number of permanent forest trees planted.

The ability to stump shoots from adult tree stumps is preferred, as the adult root does not die after harvesting of the permanent forest trees and thus the subterranean soil functions and soil protection are not destroyed. New shoots sprout from the adult root, which renew (e.g. regenerate) the commercial-permanent-forest. For example, the permanent forest tree species maple, ash, robinia, hornbeam, lime, poplar, aspen, willow, elm, sweet chestnut, rowan, hazel and tree hazel, plane tree, and to a lesser extent, oak, beech, sorb tree, service tree, mountain ash, cherries, birch, yew and sequoia, produce stump sprout from adult roots.

The permanent forest tree species planted during the establishment of the permanent forest strip may at least partially have the capacity for basal shoot. It is preferable to renew (e.g. regenerate) the commercial-permanent-forest after it has been harvested via basal shoot if the tree species concerned is also to be represented in the future stock. In this case it is preferable to plant a second permanent forest tree species that is also capable of basal shoot, so that tree species diversification can be maintained. Tree species capable of basal shoot form new shoots from subterranean root runners which appear in large numbers within a radius of up to 30 m from the old tree stump. Usually this uncontrolled, explosive type of renewal is not preferred, as the stock area can easily "tip" towards monoculture.

According to one embodiment permanent forest tree species capable of basal shoot are at least partially planted when establishing the permanent forest strip. In this case, preferably less than 34%, preferably less than 25%, of the permanent forest trees planted when establishing the permanent forest strip have the capacity for basal shoot, based on the total number of permanent forest trees planted.

Permanent forest tree species capable of basal shoot include robinia, alder, aspen, sweet chestnut, and sorb tree.

The permanent forest tree species planted when establishing the permanent forest strip are preferably not invasive permanent forest tree species. In Germany, for example, the tree species ash-maple, tree-of-god, red ash, late blossoming weeping cherry and paulownia are classified as invasive. In other regions, the tree species just mentioned are native and can also be planted there.

The permanent forest tree species planted when establishing the permanent forest strip are preferably permanent forest tree species which are not prone to damage.

According to one embodiment permanent forest tree species that are prone to damage are at least partially planted when establishing the permanent forest strip. In this case, preferably at most 25%, preferably at most 10%, of the permanent forest trees planted when establishing the permanent forest strip are prone to damage, based on the total number of permanent forest trees planted. Particularly prone to damage are, for example, ash, elm, spruce, sorbus species (rowan, regional), sweet chestnut, horse chestnut, larch and pear. Particularly un-susceptible to damage are, for example, robinia, douglas fir, pine, maple, birch, hornbeam, hazel, tree hazel, lime, beech, and oak.

The permanent forest tree species planted when establishing the permanent forest strip are preferably fast-growing permanent forest tree species.

In this way, it is possible to build up large amounts of humus in a short time. Alternatively, permanent forest tree species with a high shade tolerance can be planted.

The permanent forest tree species planted when establishing the permanent forest strip are selected and combined according to soil conditions, climatic conditions, and local conditions and according to forestry practice.

The permanent forest tree species planted when establishing the permanent forest strip preferably reach tree heights of at least 5 m at adult age, more preferably at least 15 m, especially at least 20 m. Particularly preferred are permanent forest trees that reach a tree height of 20 to 25 m at adult age.

Trees whose tree height at adult age exceeds 25 m have an increased risk of wind breakage due to the stronger leverage forces that the wind can exert on the tree. This is an important sustainability consideration, in particular because of the more frequent strong-winds that will occur in the future. Permanent forest tree heights that are too low may take too long to establish crown-closure.

According to one embodiment the establishment of the permanent forest strips involves at least partial planting of permanent forest tree species whose tree height at adult age is 20 to 25 m.

According to one embodiment only permanent forest tree species with a tree height of 20 to 25 m are planted when establishing the permanent forest strips.

Permanent forest tree species that reach a tree height of 20 to 25 m at adult age include, for example, maple (e.g. Norway maple *Acer platanoides*), horse chestnut (*Aesculus hippocastanum*), alder (*Alnus* spec.), birch (*Betula* spec.), hornbeam (*Carpinus* spec.), tree hazel (*Corylus colurna*), walnut (*Juglans* spec.), cherries (*Prunus* spec.), elm (*Ulmus* spec.), robinia (*Robinia* spec.), Amur cork tree (*Phellodendron amurense*), amber tree (*Liquidamber* spec.), leather pod tree species (*Gledisia* spec.), trumpet trees (*Catalpa* spec.), camphor tree (*Cinnamomum camphora*), rubber elm (*Eucommia ulmoides*), bamboo (Bambusoidea with subspecies Arundinarieae, Bambuseae, and Olyreae, e.g. Moso bamboo=*Phyllostachys edulis*), ginkgo (*Ginkgo biloba*), pine (*Pinus* spec.), yew (*Taxus* spec.), arborvitae (*Thuja* spec). and hemlock (*Tsuga* spec.).

Preferably the tree height of at least 50% permanent forest trees planted when establishing the permanent forest strip is, at adult age, at least 20 m or at least twice the shortest distance between adjacent permanent forest corridors.

Permanent forest tree species that reach tree heights of at least 20 m at adult age include, e.g., maple (e.g. Norway maple *Acer platanoides*), horse chestnut (*Aesculus hippocastanum*), alder (*Alnus* spec.), birch (*Betula* spec.), hornbeam (*Carpinus* spec.), tree hazel (*Corylus colurna*), walnut (*Juglans* spec.), cherries (*Prunus* spec.), elm (*Ulmus* spec.), robinia (*Robinia* spec.), Amur cork tree (*Phellodendron amurense*), amber tree (*Liquidamber* spec.), leather pod tree species (*Gledisia* spec.), trumpet trees (*Catalpa* spec.), camphor tree (*Cinnamomum camphora*), gum elm (*Eucommia ulmoides*), bamboo (Bambusoidea with subspecies Arundinarieae, Bambuseae and Olyreae, e.g. Moso bamboo=*Phyllostachys edulis*), fir (*Abies* spec.), cedar (*Cedrus* spec., *Calocedrus* spec)., false cypress (*Chamaecyparis* spec)., cypress (*Cupressocyparis* spec, *Cupressus* spec.), ginkgo (*Ginkgo biloba*), juniper (*Juniperus* spec.), larch (*Larix* spec.), giant sequoia (*Metasequoia glyptostroboides*), pine (*Pinus* spec.), spruce (*Picea* spec), Douglas fir (*Pseudotsuga* spec.), sequoia (*Sequoiadendron* spec.), arborvitae (*Thuja* spec.), and hemlock (*Tsuga* spec.).

Permanent forest tree species that reach tree heights of less than 20 m at adult age are, for example, apple tree, pear tree, yew tree, most of the sorbus species (service tree, hackberry, and European hazel), and hazelnut tree. These tree species are suitable for establishing the permanent forest strip if the shortest distance between adjacent permanent forest corridors is less than 11 m, e.g. 4 to 8 m, or as a mixed tree species.

The combination of tree species—in particular the combination of tree species within individual permanent forest strips—is preferably done in such a way that stocks with similar tree heights at adult age result.

According to one embodiment the shortest distance between adjacent permanent forest corridors (preferably 4 to 11 m) selected when establishing the stock is also to be equated with the overwood-target-distance of the overwood forming the stock.

Preferably, the spacing (e.g., distance) of permanent forest trees within a row of permanent forest trees when establishing the stock is less than the spacing (e.g., distance) of permanent forest trees within a row of permanent forest trees intended for stock-forming overwood (overwood-target-distance). In other words, the spacing of the permanent forest trees within a row of permanent forest trees when establishing the stock is smaller than the overwood-target-distance. In this way, selection of target trees is still possible later on and mortality losses do not cause gaps in the stock at a later stage. To darken-out the coppice strip after 20 to 35 years the permanent forest tree species and their spacing (e.g., distance) from each other should be selected so that a crown-closure can occur within at least one row of permanent forest trees in the respective permanent forest strips.

According to one embodiment the spacing of the permanent forest trees within a row of permanent forest trees in the permanent forest strips is from 2 to 10 m, preferably from 2 to 6 m. However, the spacing of the permanent forest trees within a row of permanent forest trees may also vary and be at least partly larger than the spacing mentioned in the aforementioned ranges, especially when groups of permanent forest trees are formed.

According to one embodiment the spacing of permanent forest trees within a row of permanent forest trees in the permanent forest strips 20 to 35 years after stock establishment is 2 to 10 m, preferably 2 to 6 m.

The crown diameter of permanent forest trees required to darken-out or suppress the coppice trees depends on the shortest spacing of permanent forest corridors, the shortest spacing of permanent forest trees within a permanent forest row, the stump shoots activity of the coppice trees, and the height of permanent forest trees, amongst others.

Within a permanent forest strip at least 50% of the permanent forest trees planted when establishing the permanent forest strip should have, at an adult age (for example, at an age of 40 years or with a DBH of at least 30 cm), a crown diameter that is at least as large as the shortest distance between adjacent permanent forest corridors. Permanent forest tree species that can develop a particularly large crown diameter are, for example, the tree species walnut, oak, beech, maple, ash, elm, sweet chestnut, horse chestnut, and plane tree.

Preferably, the permanent forest strip is at least partially established with permanent forest tree species that can form a large crown diameter, especially if the shortest distance between adjacent permanent forest corridors is particularly large, for example, 10.0 m or 11.0 m.

To ensure that the darkening-out of coppice trees can be successfully realized, when establishing the permanent forest strip permanent forest tree species are preferably planted which form tree crowns at adult age that have a low translucency.

According to one embodiment preferably less than 50%, in particular less than 33%, of are permanent forest trees forming highly translucent tree crowns are planted when establishing the permanent forest strip, based on the total number of permanent forest trees planted. Permanent forest tree species that form highly translucent tree crowns are, for example, birch, pine, aspen (trembling poplar), robinia, rowan and ash.

Preferably, mechanical tillage of the soil to reduce the side-vegetation is carried out within the first two vegetation periods (calculated from stock establishment). The tillage is carried out e.g. with a cultivator or a harrow, if possible between the rows of trees, but preferably at least in the unstocked transition areas (area between permanent forest corridor and coppice corridor; according to numeral 8a and 8b). The tillage has a beneficial effect on the growth progress of the young trees in the tree rows. After the second vegetation period (calculated from stock establishment), mechanical weed treatment is preferably no longer carried out.

Coppice-with-Standard

Preferably, the stock establishment of the coppice-with-standard takes place on, e.g., agriculturally used land, meadows, or acres, the area of which measures more than 1 ha, preferably more than 3 ha, in particular more than 5 ha.

Preferably, the agricultural land is characterized by a low content of organic carbon ($C_{org.}$) or humus in the topsoil. Low is, for example, less than 3%, preferably less than 2%, and particularly preferably less than 1% of $C_{org.}$ in the top 70 cm of topsoil. An initially low level of $C_{org.}$ or humus allows for a greater increase in $C_{org.}$ over the course of coppice-with-standard-forestry, and, thus, a higher potential for soil improvement and ultimately for $CO_2$ storage in the soil in the form of humus.

The humus content includes the total soil organic matter (without coarse fractions) and, thus, also the dead biomass not yet converted by soil organisms. Organic is everything that has lived at some time. The humus content is therefore identical to the $C_{org.}$. The humus content is given in % by weight and is usually related to a certain soil depth, such as from 0 to 30 cm (the upper 30 cm of the soil horizon is meant by this) or 0 to 70 cm. The humus content is determined in accordance with DIN ISO 10694 (1996), the sampling being carried out in accordance with DIN ISO 10381-4 (1995). Ecologically interesting is the amount of permanent humus that is converted or metabolized from organic matter in the topsoil by the activity of soil organisms, such as earthworms, isopods, mites, springtails, fungi, and bacteria. It is this permanent humus that is stable over decades or centuries and can be a depot for storing $CO_2$ from the atmosphere, not only eliminating the climate-damaging gas $CO_2$ from the air via the photosynthesis process of the trees or side vegetation, but, at the same time, making the topsoil more fertile. C sequestration takes place in the form of permanent humus in the soil.

During the conversion of dead organic matter nutrient humus is formed in addition to permanent humus. Nutrient humus is the part of the converted organic matter that serves as an immediate source of nutrients for the trees or plants, e.g., in the form of minerals, as a nitrogen source, or as a phosphorus source. Nutrient humus is also partially converted into permanent humus.

The organically decomposed substance of the permanent humus and nutrient humus is difficult to determine by sampling and measurement. Therefore, for quantitative statements, the above-mentioned DIN ISO measurement methods of humus content or $C_{org.}$ are used.

Preferably, the planting plan of the coppice-with-standard is characterized by at least three permanent forest strips and at least two coppice strips, in particular at least five permanent forest strips and at least four coppice strips.

Preferably, in the described coppice-with-standard, the average permanent forest strip width (AWPF) is smaller than the average coppice strip width (AWC). The average permanent forest strip width (AWPF) or the average coppice strip width (AWC) refers to the initial afforestation area and is defined as the sum of the permanent forest strip widths (WPF) divided by the number of respective permanent forest strips or the sum of the coppice strip widths (WC) divided by the number of respective coppice strips.

According to one embodiment the ratio of the average coppice strip width (AWC) to the average permanent forest strip width (AWPF) is in a range of greater than 1.0 to 4.0, preferably in a range of 1.5 to 2.0.

Preferably, the permanent forest strip width (WPF) is also smaller than the width of an adjacent coppice strip (WC). The coppice strips are preferably cultivated wider than the permanent forest strips because, due to the high youth growth, a young forest structure is achieved more quickly, which provides more easily decomposable leaf litter to build up humus. In addition, more wood biomass is formed.

Preferably, the coppice strip widths (WC) and the permanent forest strip widths (WPF) are chosen to be relatively narrow overall, so that the initial afforestation area has as many transitions from coppice strips to permanent forest strips as possible.

According to one embodiment the average width of the permanent forest and coppice strips (AWPFC) is less than 10 m, preferably less than 8 m, in particular less than 6 m. The average width of the permanent forest and coppice strips (AWPFC) refers to the initial afforestation area and is defined as the sum of the permanent forest strip widths (WPF) and the coppice strip widths (WC) divided by the number of respective permanent forest strips and coppice strips. The smaller the average width of permanent forest and coppice strips (AWPFC), the more frequently permanent forest strips can alternate with coppice strips, resulting in improved humus build-up.

Preferably, the shortest distance between adjacent coppice corridors is also less than the shortest distance between adjacent permanent forest corridors.

Preferably, the average width of the permanent forest corridors (as shown, for example, in the figures with numeral 11) is also smaller than the average width of the coppice corridors (as shown, for example, in the figures with numeral 10).

The width of the permanent forest corridors is preferably 0 to 6.5 m and the width of the coppice corridors is preferably 0.4 to 7.5 m.

The widths of the coppice corridors and the widths of the permanent forest corridors are chosen to be relatively narrow overall, so that the initial afforestation area has as many transitions as possible from coppice strip to permanent forest strip.

According to one embodiment the outer-boundary-distance between a permanent forest corridor and an immediately adjacent coppice corridor is 0.1 to 9 m, preferably 0.1 to 8 m, more preferably 2.0 to 7 m, in particular 2.8 to 6.2 m.

Another important characteristic of the coppice-with-standard concerns the distances between coppice corridors and permanent forest corridors, specifically the shortest distance between the corridor-outer-boundary of a coppice corridor and the corridor-outer-boundary of an adjacent permanent forest corridor. The shortest distance between the corridor-outer-boundary of a coppice corridor and the corridor-outer-boundary of an adjacent permanent forest corridor is defined as the "outer-boundary-distance."

In the context of the present disclosure the term "outer-boundary-distance" refers to the shortest distance between the permanent forest corridor of a permanent forest strip and the coppice corridor of an immediately adjacent coppice strip, wherein the distance between the permanent forest corridor of the permanent forest strip and the coppice corridor of the immediately adjacent coppice strip (i.e., the distance between the habitation corridor of a permanent forest strip and the habitation corridor of a coppice strip forming the sequence permanent forest strip-coppice strip) is determined from the mean distance between an outer boundary of the permanent forest corridor extending in the longitudinal direction of the permanent forest strip and the nearest outer boundary of the coppice corridor of the immediately adjacent coppice strip extending in the longitudinal direction of the coppice forest strip (i.e. between an outer boundary of the habitation corridor of the permanent forest strip and the nearest outer boundary of the habitation corridor of an immediately adjacent coppice strip).

According to one embodiment the outer-boundary-distance between the permanent forest corridor of a permanent forest strip and the coppice corridor of a first immediately adjacent coppice strip is different than the outer-boundary-distance between the permanent forest corridor of the permanent forest strip and the coppice corridor of a second immediately adjacent coppice strip. In this case, the outer-boundary-distance between the permanent forest corridor and the coppice corridor of the first immediately adjacent coppice strip is 2.0 to 4.0 m and the outer-boundary-distance between the permanent forest corridor and the coppice corridor of the second immediately adjacent coppice strip is 4.0 to 6.0 m.

This different outer-boundary-distance results in more light being available to the permanent forest trees for undisturbed juvenile growth and also facilitates the mechanical harvesting of the coppice trees, as there is room for a tractor and trailer driving next to the chipper (at least in the wider part). Furthermore, the area of ground around the permanent forest trees is also spared when harvesting the coppice trees.

The permanent forest trees also receive more water from layers close to the ground due to the preferred large outer-boundary-distance (e.g. 4 to 6 m together with 2 to 4 m), especially in the juvenile phase, because the coppice trees grow much more strongly than the permanent forest trees, especially in the first 10 to 20 years, and, thus, also consume more water. Furthermore, the permanent forest trees receive sufficient light for growth due to the preferred large outer-boundary-distance (e.g. 4 to 6 m together with 2 to 4 m).

When using fast-growing poplars as coppice trees this relatively large spacing is especially important because poplars can grow up to 10 meters tall within a rotation period of 4 to 5 years, forming thereby a relatively dense crown-canopy.

According to a preferred embodiment the sum of the two outer-boundary-distances of a coppice corridor to the permanent forest corridors adjacent to the coppice corridor is greater than the width of the coppice corridor lying between the two permanent forest corridors. In other words, the unstocked transition area in a segment with the sequence permanent forest strip-coppice strip-permanent forest strip is greater than the area occupied by the coppice corridor (assuming equal segment length).

This is shown, for example, in FIG. 2, where the sum of the distances designated as numerals 8a and 8b is greater than the distance designated as numeral 10.

The unstocked transition areas between the permanent forest corridors and the coppice corridors contain both side-vegetation and leaf litter and sufficient light and rainwater reach the topsoil, so that rapid metabolism of leaf litter and side vegetation can occur through the activity of soil organisms, which serves as food for the soil organisms and accelerates permanent humus formation. Compared to leaf litter, the side-vegetation has a lower carbon to nitrogen ratio (C/N ratio) and can thus be metabolized more quickly by the soil organisms. This ensures a diverse and quickly usable food supply for the soil organisms right from the start. The rooting depth of the side-vegetation is usually shallower than the rooting depth of the coppice trees. In sum, the combination of coppice trees and side-vegetation provides greater root penetration of the upper soil horizon, resulting in more effective overall biomass formation. The combination of leaf litter and dead side-vegetation is particularly preferred in terms of quality and quantity of biomass made available for the purpose of metabolism by soil organisms. Furthermore, the "fodder" for the soil organisms lasts throughout the entire year because of the different C/N ratios. Because of the large distance from coppice corridor to permanent forest corridor (sum of numerals 8a and 8b) little competition between permanent forest trees and coppice trees for resources such as water, light, and soil nutrients is created. Furthermore, a rapid buildup of humus is achieved due to the large foliage and root litter formation of coppice trees and the existing side-vegetation.

Soil organisms, e.g., earthworms, springtails, horn mites, millipedes and isopods, but also organic matter decomposing fungi (saprophytes) and bacteria, are involved in the metabolism of foliage. An intact and properly structured forest soil contains 20 to 25 tons per hectare of live mass of soil organisms. This is equivalent to the live weight of 4 adult elephants. There are up to 2 tons per hectare of earthworms alone, which represent in particular the formation of permanent humus. For comparison: One hectare of acre rarely exceeds 5 tons of live weight per hectare of soil organisms.

If the permanent forest trees are too heavily shaded also single rows of coppice can be removed, so that more light reaches the permanent forest trees. The shading of the permanent forest trees is not constant over the rotation period of the coppice trees. While the crown-canopy of coppice trees absorbs a relatively large amount of light shortly before harvesting, nearly full light reaches the permanent forest trees during the vegetation period after the coppice trees have been harvested. Strip width, strip spacing, and planting density are not necessarily rigid and may vary within an initial reforestation area within the established ranges.

According to one embodiment, the planting density of the coppice trees is 2,500 to 5,000 pieces per hectare and the planting density of the permanent forest trees is 400 to 1,000 pieces per hectare, based on the total area of the coppice-with-standard.

Moreover, a method is for establishing the coppice-with-standard described is disclosed, in particular a method for establishing a coppice-with-standard which includes providing at least three permanent forest strips comprising permanent forest trees and providing at least two coppice strips comprising coppice forest trees, wherein coppice strips and permanent forest strips are arranged alternately so that a coppice strip is arranged between two permanent forest strips immediately adjacent thereto.

The average width of the permanent forest strips can be narrower than the average width of the coppice strips. It is also advantageous if the shortest distance between adjacent permanent forest corridors is 4.0 to 11.0 m, preferably 6.0 to 10.0 m, in particular 8.0 to 10.0 m.

Furthermore, a method for establishing a commercial-permanent-forest is disclosed, wherein at first the described coppice-with-standard is established and subsequently the coppice trees of the coppice strips are harvested recurrently with rotation periods of 3 to 5 years, wherein the permanent forest trees established in the coppice-with-standard are not completely harvested during the method for establishing a commercial-permanent-forest, but are removed at most individually, so that the permanent forest trees remain at least at the overwood-target-distance of 4 to 11 m, so that over time the coppice forest trees are darkened-out by the dominance of the permanent forest trees and the ratio of the wood stock in volume solid metres (VSM) of permanent forest trees to coppice forest trees is at least 1, thus, establishing a commercial-permanent-forest.

From the second autumn after the establishment of the stock, significant amounts of falling leaves already accumulate on the topsoil of the coppice strip and between the permanent forest corridor and coppice corridor (i.e., in the unstocked transition area according to numerals 8a and 8b). The amounts of leaf litter of the permanent forest trees are negligible at this point, the amounts of leaf litter of the coppice trees are already high at this point. The accumulated leaf litter is preferably easily decomposable and accumulates in the largest possible quantities and after a short start-up period. Furthermore, from the second year onwards, the side-vegetation grows preferentially in the transition area between coppice and permanent forest corridors. Side-vegetation is characterized by a low C/N ratio and causes a rapid decomposition rate of, e.g., 4 to 8 months by soil organisms. According to one embodiment, leaf litter has a C/N ratio of 25 and is decomposed by soil organisms within 1 to 1.5 years.

According to one embodiment the first rotation of the coppice trees takes place after 2 to 20 years, preferably after 3 to 5 years. During the rotation, at least 85% of the coppice trees are harvested, preferably the tree stock is harvested completely. Completely means that at least 95% of all coppice trees in the coppice strip are harvested during one rotation.

According to one embodiment the rotation periods of the coppice strips are 2 to 10 years, preferably 3 to 6 years, in particular 3 to 5 years.

The preferred rotation period depends predominantly on the selected tree species and its growth rate, in particular on the thickness growth near the ground and the speed for the formation of the crown-closure. Short harvesting intervals of 3 to 5 years promote leaf litter decomposition and prevent the formation of a leaf litter ground layer. The reason for this is that the shading by the crown-canopy of coppice trees is repeatedly interrupted and, thus, more light and rain hit the ground, which accelerate the leaf decomposition processes.

Up to a tree diameter of 20 cm at a height near the ground of 5 to 25 cm, economically operating cutter forage harvesters can be used for harvesting. Mechanical harvesting with a cutter forage harvester is conducted continuously. Trees are cut off, pulled in, and then chopped whilst driving. The chopped material is blown onto a transfer wagon travelling in parallel. Harvesting is preferably done outside the vegetation period of the trees. Tree stumps (tree stumps with a height of about 5 to 25 cm) and a foliage layer (caused by leaf litter from the $2^{nd}$ vegetation period onwards) remain in the field.

The coppice rotation is characterized by a so-called stump shoot behavior, i.e. new shoots or trees sprout from the harvested coppice stumps. Since the freshly sprouting trees or shoots use the existing root, the growth rate in the second rotation is faster than in the first rotation. The trees of the permanent forest strip are preferably not harvested or only harvested in small numbers within the first 4 to 7 years, i.e. there are only individual removals as required. Preferably, no entire rows of permanent forest trees are removed. The coppice trees are harvested in short rotation (e.g. every 3-5 years) and are cut back to the stump, whereby permanent forest trees continue to grow without significant quantities of these being harvested.

The periodic harvesting of coppice trees temporarily causes an increased supply of light to the topsoil. The increased light supply takes place both within the area of the coppice strips and within the area of the permanent forest strips. The increased light supply increases the soil temperature, which has a positive effect on the transformation into permanent humus. On the other hand, after a certain period, heavily shaded areas form again between the tree rows within the coppice trees, which lead to high soil moisture. It is precisely these alternations between light/temperature and shade/humidity that accelerate the build-up of humus. Such conditions cannot be well controlled in a normal forest or woodland.

Individual trees within a permanent forest tree row can be removed over time, for example, after 7 to 25 years, in particular after 7 to 20 years, to promote certain permanent forest trees. The interventions are preferably to be carried out in a low number, as enough shade pressure is still to be exerted on the coppice strips by the crown-canopy of the permanent forest trees for the later conversion into a commercial-permanent-forest.

According to one embodiment a maximum of 50% of the planted permanent forest trees are removed within the first 12 years after the establishment of the permanent forest strips and a maximum of 75% of the planted permanent forest trees are removed within the first 20 years after the establishment of the permanent forest strips, based on the total number of permanent forest trees in a permanent forest strip. With a planting density of permanent forest trees when establishing the coppice-with-standard of, e.g., 300 to 2,000 pc. per hectare total area, at least 150 to 1,000 pc. permanent forest trees remain on one hectare total area after 12 years and at least 83 to 500 pc. permanent forest trees remain on one hectare total area after 20 years.

In mathematical terms, an initial planting density of 300 pc./ha and a 75% individual removal rate would result in a residual stock of permanent forest trees of 75 pc./ha. However, a tree density of 75 pc./ha would fall short of the tree density of 83 pc./ha resulting from the maximum overwood-target-distance. The maximum overwood-target-distance is 11 m within the permanent forest row and 11 m in relation to adjacent permanent forest corridors, so that arithmetically a tree density of 100/11*100/11=82.6 pc./ha results.

For example, 20 to 35 years after the establishment of the stock the permanent forest trees have grown strongly in height and width so that the crown-canopies of the permanent forest trees of adjacent permanent forest strips provide at least 50% shade. This shade causes the stump shoots (after a rotation) of the coppice trees of the intervening coppice strip to come predominantly to a halt due to the lack of light.

The coppice trees have been cultivated in short rotation for the previous 20 to 35 years and have been completely harvested 5 to 8 times, for example, which also results in reduced stump shoot behavior. Against this background (darkening-out and reduced stump shoot behavior) the permanent forest trees can dominate over the young shoots of the coppice trees.

According to one embodiment, 20 years after stock establishment, at least 50% of the coppice trees planted when stablishing the coppice strips are darkened-out, preferably at least 75%, and particularly preferably at least 85%, based on the total number of coppice trees planted. With a planting density of coppice trees of 1,500 to 5,000 pc. per hectare (based on the total establishment area) this means that in the case of an 85% darkening-out rate 225 to 750 pc. coppice trees survive per hectare and total area. This number seems quite high. However, it must be borne in mind that these are relatively small coppice trees that cannot establish themselves over time and mainly die.

According to an advantageous embodiment up to 15% of the coppice trees planted when stablishing the coppice strips remain in the commercial-permanent-forest up to an age of the stock of 25 to 40 years, based on the total number of coppice trees planted. In this way the remaining coppice trees can bridge the subterranean mycorrhizal network until the permanent forest root system and mycorrhizal network is extensive enough to reach from one permanent forest strip to the next. The remaining coppice trees can be harvested over the course of further years leaving predominantly permanent forest trees.

In addition to considering the number of trees it may be useful to consider, from 20 to 35 years after the establishment of the coppice-with-standard onward, the wood-stock-volume in volume solid meters [VSM] because it is quite possible and desirable that a large number of small coppice trees exist in the half-shade of the permanent forest trees next to permanent forest trees with high volume.

At the adult age of the permanent forest trees, e.g., 40 years after establishing the stock, the predominant wood-stock-volume can be assigned to the permanent forest trees, while the coppice trees represent less than 50%, preferably 2 to 20%, of the wood-stock-volume.

Up to the adult age of the permanent forest trees further permanent forest trees can be liberated from crowding permanent forest or coppice trees, so that even within a permanent forest row a spacing of the permanent forest trees in the sense of the overwood-target-distance of, e.g., 4 to 11 m, preferably of 6 to 10 m, results.

Individual removal of permanent forest trees is carried out such that approximately 83 to 625 pieces permanent forest trees at adult-age remain per hectare of total area. A residual stock of 83 pieces permanent forest trees at adult-age corresponds to an overwood-target-distance of 11 m and a residual stock of 625 pieces permanent forest trees at adult-age corresponds to an overwood-target-distance distance of 4 m. Preferably, 100 to 625 pieces of permanent forest trees at adult-age per hectare of total area remain in the stock.

In the context of the present disclosure, the term "overwood-target-distance" relates the shortest spacing of permanent forest trees both within a row and with respect to adjacent permanent forest rows.

For example, after a rotation period of 40 to 120 years or after reaching diameter at breast height of 30 to 60 cm, the permanent forest trees standing in the overwood-target-distance can preferably be harvested completely (at least 85%) by felling. The harvested permanent forest trees may be characterized, for example, by a, straight-growing and branch-poor and continuous lower trunk section and may be used for furniture or veneer wood production. Alternatively, the permanent forest trees can be used as timber.

The converted commercial-permanent-forest comprises at least one tree species outside the group of coppice tree species. Particularly preferably, the commercial-permanent-forest comprises two or more permanent forest tree species.

From an ecological point of view, the special strip-by-strip cultivation of coppice strips and permanent forest strips achieves a rapid build-up of the subterranean soil environment, with the focus not only on speed, but also on the conversion into a commercial-permanent-forest of continuous nature.

In total, 1.6 to 2.3 tons of carbon (C) per hectare and year [t C/ha*J] or a total of 128 to 184 t C/ha (over a period of 80 years, for example) are sequestered from the leaf and root litter and the litter of the side vegetation in the form of $C_{org.}$, in particular in the form of permanent humus. This corresponds to a calculated $CO_2$ equivalent of 5.9 to 8.4 tons of $CO_2$ per hectare per year. The binding of $CO_2$ in the form of above-ground biomass (mainly wood) and in the form of below-ground root mass has not yet been considered.

The storage of carbon in the upper 70 cm of the soil horizon does not take place in a linear fashion but begins with a loss of carbon in the soil when the stock is established by tillage with the flight. From the $3^{rd}$ year after stock establishment carbon storage in the soil increases within 20 years up to values of 3.3 t C/ha*J (calculated from the sum of the values of C accumulation in [t C/ha*J] after 8 years from tables 1 and 2). Within the first 20 years after stock establishment a total of 45.7 t C/ha or an average of 2.3 t C/ha*J of carbon can be accumulated in the soil (calculated from the summed values of C accumulation in [t C/ha*J] after 20 years from Table 1 (26.0 t C/ha*J) and Table 2 (19.7 t C/ha*J)). These high C accumulation values of 45.7 t C/ha within the first 20 years after stock establishment are due to the high biomass input to the soil in the form of leaf litter, side vegetation, and the dead fine roots combined with the activity of soil organisms that convert the biomass to nutrients and permanent humus.

The C-balance also includes the underground root mass. According to KRAMER, the ratio of root mass to above-ground tree mass is 1:4, i.e. 20% by weight of the tree grows below-ground and 80% grows above-ground. In particular coppice trees form a lot of root mass within the first 20 years. Due to the narrow-stand of coppice trees, the soil horizon is rooted particularly quickly and extensively. Short rotation cultivation can further favor root mass formation. If 60% of the total area is planted with coppice rows, the coppice tree species poplar can produce e.g. 6 t/ha*J of wood dry matter over a period of 20 years and in relation to the total area, so that a ratio of 1:4 can lead to 1.5 t DM/ha*J of root mass increase. Over 20 years of short rotation cultivation, 30 t DM/ha of root mass is thus formed in the coppice strip, based on the total area. With a C share of the root dry matter of 50%, this corresponds to a C equivalent of 0.75 t C/ha*J and 15 t C/ha (over 20 years).

In particular the wood biomass resulting from the fast-growing coppice trees in the first 20 to 35 years can serve as a substitute for fossil fuels and thus contribute to a reduction or emission reduction of the greenhouse gas $CO_2$. For example, the annual growth rate of above-ground biomass of coppice trees averages 6 t DM/ha*J of wood dry matter over a 25-year period relative to the total area. The 6 t DM/ha*J corresponds to a C-equivalent of 3 t C/ha*J or 60 t C/ha over a period of 20 years.

Furthermore, the permanent forest trees sequester carbon in the form of wood biomass. If one assumes, for example, an average wood increment over 80 years of 5 volume solid metres per hectare and year (VSM/ha*J), this results in a C-equivalent of 1.5 t C/ha*J. During coppice cultivation, e.g. in the first 20 years, the wood increment of the permanent forest trees is less than 5 VSM/ha*J, thereafter the increment is greater. Of course, the increment depends, among other things, on the selected tree species and the site conditions. Therefore, the increment data can vary considerably and serve only as a point of reference and to complete the carbon balance. For example, within the first 20 years after stock establishment, wood increment is 2.5 VSM/ha*J or a total of 50 VSM/ha. A wood density of 0.6 t/VM results in a wood dry matter of permanent forest trees of 30 t/ha within the first 20 years. With a C proportion of the wood dry matter of 50%, a C accumulation in relation to the permanent forest biomass results in 15 t C/ha within the first 20 years after stand establishment.

Considering the sums of C accumulation and C emission reduction of the described coppice-with-standard over a period of 0 to 20 years, 45.7 t C/ha is accumulated in the form of humus, 15 t C/ha in the form of root mass, 15 t C/ha in the form of permanent forest wood mass, i.e. a total of 75.7 t C/ha is accumulated. 60 t C/ha can have C-emission-reducing effect in the form of coppice biomass. Altogether, this amounts to 135.7 t C/ha or 6.785 t C/ha*J in the first 20 years.

Extrapolating the C accumulation of the described coppice-with-standard further over a period of 80 years, considering the C emission reduction due to coppice cultivation only for the first 20 years, results in a total possible C accumulation (including C emission reduction) of 300 to 500 t C/ha (on average 400 t C/ha or 5 t C/ha*J) within 80 years.

Within the first 20 years the average annual C accumulation rate is higher than the 80-year average which means that with the disclosed coppice-with-standard very much C is accumulated very quickly (within the first 20 years).

In the case of the establishment of a permanent forest according to conventional methods, the conditions are exactly reversed, i.e., here the average annual C accumulation rate increases from a stock age of more than 20 years.

Through the large-scale conversion of arable land into commercial-permanent-forest significant amounts of C or $CO_2$ can be bound into the soil in the form of permanent humus through the work of soil organisms. In addition, fossil fuels can be saved through utilization as firewood.

An advantage of the silvicultural concept according to the present invention compared to the establishment of a permanent forest according to conventional methods is the increased speed of biomass production. An advantage of the silvicultural concept according to the present invention compared to the establishment of a coppice forest according to conventional methods lies in the sustainability with regard to the bound permanent humus (no tillage of the soil) and in the diversification of the tree species (no monoculture problem).

EXAMPLES

Example 1

Example 1 is shown in FIG. 2 and relates to a coppice-with-standard established strip-by-strip consisting of a single-row strip of permanent forest trees alternating with a double-row strip of coppice trees.

The coppice-with-standard having an area of one hectare was established on a loamy sand soil with the acreage number 30-40, with groundwater connection prevailing in 60 to 80 cm.

Starting from the left, the planting plan first shows a double-row coppice strip, a single-row permanent forest strip, a double-row coppice strip, a single-row permanent forest strip, a double-row coppice strip, a single-row permanent forest strip and a double-row coppice strip. The distance between two rows of coppice trees within a coppice forest strip is 3 m (numeral 1). The spacing of coppice trees within a row of coppice trees in a coppice strip is 0.40 m. There are 5,000 pc. coppice trees planted per hectare of total area. The outer-boundary-distances between a permanent forest corridor and two adjacent coppice corridors is unequal and is 2 m and 5 m (numerals 8a and 8b). The spacing of permanent forest trees within a row of permanent forest trees in a permanent forest strip is 2 m. Converted, 500 permanent forest trees were planted per hectare of total area.

From left to right, a spacing pattern results in which the distance between the first coppice row and the second coppice row is 3 m, the distance between the second coppice row and the first permanent row is 2 m, and the distance between the first permanent forest row and the third coppice row is 5 m. The coppice strip width (WC) is 6.5 m (numeral 6). The permanent forest strip width (WPF) is 3.5 m (numeral 7). The coppice strips are thus wider than the permanent forest strips by a factor of 1.86. The average width of permanent forest and coppice strips (AWPFC) is 5 m. The shortest distance between adjacent permanent forest corridors is 10 m (numeral 3). The shortest distance between adjacent coppice corridors is 7 m (numeral 4). The shortest distance between adjacent permanent forest corridors (numeral 4) is shorter than the shortest distance between adjacent coppice forest corridors (numeral 3). The widths of coppice corridors are 3 m (numeral 10) and the widths of permanent forest corridors are 0 m (numeral 11). The width of a coppice corridor is less than the sum of the outer-boundary-distances between a permanent forest corridor and two immediately adjacent coppice corridors (sum of 8a and 8b equals 7 m).

The coppice trees consist of a mixture of two poplar species and one willow species. The poplar species are Max4 and Hybrid 275 and the willow species is Olof. The willow species Olof is characterized by having few new shoots (stump shoots) after harvest, like poplars. The poplar species and the willow species were planted as single origin varieties in the form of 20 cm long saplings (e.g., one-year-old stem cuttings) within a coppice strip in the soil of a previously loosened arable soil.

The permanent forest trees consist of a mixture of the tree species walnut (*Juglans major×Juglans regia*; trade name Garavel-Hybide "MJ 209"), tree hazel (*Corylus colurna*) and wild cherry (*Prunus avium*). The selected trees are among the noble woods and all reach a tree height of 20 to 25 m at adult age. The planting material consists of 2-year-old cuttings with an initial height of 50 to 80 cm for walnut and tree hazel, and 3-year-old cuttings with an initial height of 150 to 180 cm were used for wild cherry. Each permanent forest cutting receives a protective sweep cover after planting. Game browsing does not occur in walnut and only sporadically in tree hazel, so no further protective measures were taken.

The wild cherry is highly susceptible to browsing. Therefore, the cuttings were selected with a minimum height of 150 cm so that deer can no longer eat the shoot tips. The planting of the permanent forest trees was not carried out with single origin species; 2 permanent forest tree species were planted alternately in each permanent forest row. Wild cherry and walnut are mixed with tree hazel in a 1:1 ratio, so that 50% of the permanent forest trees are tree hazel and 25% of each of the permanent forest trees walnut and wild cherry. The reasons for the predominance of tree hazel are the particularly good mycorrhiza formation, the stump shoots from adult roots, the easily decomposable litter, and the good shade tolerance of tree hazel.

At adult age, the tree heights of the permanent forest trees planted when establishing the permanent forest strip are at least twice as tall as the shortest distance between adjacent permanent forest corridors. Since the shortest distance between adjacent permanent forest corridors is 10 m and the adult tree heights of the selected permanent forest tree species are between 20 and 25 m a forest-forming crown-closure between permanent forest trees of adjacent permanent forest corridors is ensured at adult age.

The following planting pattern results when viewed from left to right:
Max4/Max4/walnut and tree hazel (1:1)/Olof/Olof/wild cherry and tree hazel (1:1)/Hybrid 275/Hybrid 275/walnut and tree Hazel (1:1)/Max4/Max4.

Within the first two vegetation periods after establishment mechanical tillage of the soil was carried out to reduce the side-vegetation. The tillage was carried out with a cultivator between the rows of trees. The tillage had a beneficial effect on the establishment of young trees in the tree rows. Furthermore, side-vegetation regulation was carried out with a hoe within the rows during the first growing season.

In the winter after the fourth vegetation period the coppice rows with the approx. 6 m high poplars and willows were completely harvested for the first time with a cutter forage harvester and used for material production (chipboard processing). Due to the relatively large distances between the coppice corridors and the permanent forest corridors (numeral 8b), a tractor with trailer was able to drive next to the cutter forage harvester during harvesting to pick up the wood chips.

The permanent forest trees were not damaged due to the relatively large distance according to numeral 8b. The harvest quantity of the first harvest was the equivalent of 2.8 t pc./ha*J dry wood chips, calculated based on the total area. The permanent forest trees were 1 to 3 m tall in winter after the fourth vegetation period and were not harvested.

In the following year, after the coppice trees were harvested, stump shoot occurred within the coppice strips. The one-year old shoots were between 3 and 4 m high in the fall. Harvesting of the coppice rows was carried out four more times with a four-year rotation period before the grounds where partially cleared with the rotary tiller in the 23rd year.

The amount of wood chips harvested in the coppice strip increased to over 7 to 7.5 t DM/ha*J, based on the total area. On average over 20 years, 6 t DM/ha*J of wood chips are harvested, based on the total area. In relation to the area of the coppice strip, this corresponds to 10 t DM/ha*J. According to KOLLMANN 2.4 t DM of wood chips correspond to the heating value of 1,000 L of heating oil. Over a period of 20 years a heating equivalent of 83,000 L of fuel oil is produced on an area of one hectare. With a carbon content of the dry wood mass of 50%, 6 t DM/ha*J results in a C emission reduction equivalent of 3 t C/ha*J, or 60 t C/ha over 20 years.

With respect to the permanent forest trees, there was a relatively low failure rate within the 20 years (about 20-30% of the original planting numbers). The first value-cutting (or value-delimbing, or value-pruning) took place after 5 years. Value-cutting was conducted according to the state of the art, in particular to straight-stemmed permanent forest trees so as to promote the formation of a 5-metre-long clean stem section as viewed from the ground. 8 years after the establishment of the stock, the first individual removal of the permanent forest trees took place in order to prevent the strong-growing specimens from being restricted in their growth. Individual removal after 8 years resulted in distances of permanent forest trees within a permanent forest strip of 2 to 6 m, leaving 300 pc./ha of permanent forest trees on the total area. Another individual removal of permanent forest trees took place in year 14 after stock establishment. The number of permanent forest trees was reduced to 220 pc./ha. After 20 years 216 pc./ha of permanent forest trees remain (based on the total area) with an average diameter at breast height of 16 cm and an average height of 12 m. The wood stock of the permanent forest trees after 20 years is approx. 50 VSM/ha, which corresponds to a dry wood mass of 30 t DM/ha at an average wood density of 0.6 t/VSM. With a C content of the wood dry matter of 50%, the 30 t DM/ha of permanent forest tree mass corresponds to a C equivalent of 15 t C/ha.

After 20 years, the permanent forest trees have grown so much in height and width without any further removals that there is almost no more stump shoots in the coppice trees.

The permanent forest trees dominate the total stock 20 years after stock establishment. Although crown-closure has not yet taken place after 20 years only 600 pc./ha of coppice trees with a noteworthy shoot height of 1 to 1.5 m (measured at the end of the vegetation period) still sprout from the stump in the 21st year (1 year after the 5th harvest), mainly from the centrally located coppice rows. This corresponds to 12% of the initially planted number of coppice trees. Many coppice trees (approx. 50%) no longer sprout at all and others (approx. 38%) have a stump sprout of less than 1 m in height. The growth of the shoots is noticeably reduced because the light supply is lacking due to the special decentralized arrangement of the coppice rows and because the coppice tree species used are very light-demanding tree species. Decentralized means that the distance between the permanent forest trees on the left (numeral $8b$) and on the right (numeral $8a$) of the coppice rows is different. At the end of the 22nd year, 80% of the shoots that were 1 m to 1.5 m high in the previous year have grown to 1.5 to 2 m and the shoots that were <1 m high in the previous year have grown to up to 1.5 m. As the crown-canopy of the permanent forest trees continues to close with time and the permanent forest trees have such a large growth advantage, after 22 years, there is no danger that the coppice trees could dominate the permanent forest trees in the future. Should it nevertheless be the case that individual coppice trees shoot up strongly in height or close gaps in the permanent forest strip this can be seen as a welcome enrichment of tree species. Establishment of the permanent forest trees has occurred successfully 22 years after stock establishment.

Table 1 and Table 2 show the dry matter quantities of leaf and root litter and side-vegetation and the carbon and humus accumulation occurring over a 20-year period within the coppice and permanent forest strips.

As an indicator of the C accumulation in the upper 70 cm of the soil the following rough estimate or calculation can be used. If one assumes that the carbon content of the occurring dry matter from the side-vegetation, leaf litter, and root litter is 50% by weight and that ⅓ of this carbon is retained in the upper 70 cm of the soil horizon in the form of organic carbon (without roots, without organisms, and without other coarse particles as well as without carbonate) by the metabolism of the soil organisms, this results, e.g., in year 8 year after stock establishment, in a C accumulation of 0.5*(13.3+6.5)/3=3.3 t C/ha*J, based on the total area, wherein the value 13.3 corresponds to the total DM in [t DM/ha*J] of Table 1 after eight years and the value 6.5 corresponds to the total DM in [t DM/ha*J] of Table 2 after eight years.

For the 20th year, for example, the calculated C accumulation is 0.5*(9.4+6.2)/3=2.6 t C/ha*J, wherein the value 9.4 corresponds to the total DM in [t dry matter/ha*J] from Table 1 after 20 years and the value 6.2 corresponds to the total DM in [t DM/ha*J] from Table 2 after 20 years.

Over the first 20 years after establishment of the stock a calculated total C accumulation in the upper 70 cm of the soil horizon of 0.5156.2/3=26 t C/ha results in the case of the coppice strip and of 0.5118.2/3=19.7 t C/ha in the case of the permanent forest strip. Taking into account the total area, the C accumulation resulting from the metabolism of side-vegetation, leaf litter and root litter is 26+19.7=45.7 t C/ha.

Over the first 8 years after establishment of the stock, there is a calculated C accumulation in the upper 70 cm of the soil horizon of 0.5*57/3=9.5 t C/ha in the case of the coppice strip and of 0.5*14.4/3=2.4 t C/ha in the case of the permanent forest strip. Considering the total area, the C accumulation resulting from the metabolism of side-vegetation, leaf litter and root litter is 9.5+2.4=11.9 t C/ha.

The calculated values of C-accumulation are similar to the C-accumulation determined by measurement according to the combustion method with the LECO device CHN 1000 after 8 and 20 years. The measured organic carbon in the upper 70 cm of the soil horizon was 1.0 wt. % before stock establishment (considering the total area), 1.1 wt. % after 8 years, and 1.5 wt. % after 20 years. The mean soil density was 1.5 t/m³. The volume of the upper 70 cm of the soil horizon, based on one hectare (1 ha=100 m*100 m), is 7,000 m³. The mass of the upper 70 cm of a hectare of soil is mathematically 10,500 t. Thus, based on the total area, the percentage of organic carbon could be increased by cultivating the coppice-with-standard according to the planting plan of FIG. 2 from initially 105 t/ha to 116 t/ha after 8 years and to 158 t/ha after 20 years. The measured C accumulation was 11 t/ha after 8 years (calculated: 11.9 t/ha) and 53 t/ha after 20 years (calculated: 45.7 t/ha).

In addition to the C accumulation caused by the side-vegetation, leaf litter, and root litter, the root mass itself can be considered to amount to a C accumulation of 0.75 t C/ha*J or 15 t C/ha, based on the total area over a period of 20 years.

According to KRAMER, the subterranean root mass of a tree stock is 20% by weight and the above-ground tree mass accounts for 80%. Especially coppice trees form a lot of root mass within the first 20 years. Coppice cultivation provides 6 t/ha*J of dry wood mass over a period of 20 years and 1.5 t/ha*J of root mass, each based on the total area. In 20 years of short-rotation cultivation 30 t DM/ha of root mass are thus formed in the coppice strip. With a C share of the root dry matter of 50%, this corresponds to a C equivalent of 0.75 t C/ha*J and 15 t C/ha (over 20 years). The root mass that the permanent forest trees develop within 20 years was neglected.

Table 3 shows the total C-balance of the coppice-with-standard within the first 20 years.

The wood chips from short-rotation cultivation have an emission-reducing effect of 60 t C/ha carbon, as the combustion of woodchips can substitute fuel oil or coal.

The humus build-up through the metabolism of the side-vegetation, leaf litter and root litter by soil organisms binds 53 t C/ha (the actual measured value was taken as a basis). The subterrane root mass of coppice trees binds 15 t C/ha and the woody stock of permanent forest trees also accumulates 15 t C/ha. In total, 143 t C/ha are bound or contribute to the substitution of fossil fuels. This corresponds to an average annual C elimination of 7.15 t C/ha*J or 26 t $CO_2$/ha*J (observation period: 0-20 years).

For the period after short-rotation cultivation, or in the present case >20 years, the rules for C-elimination according to common calculation for the cultivation of permanent forests apply.

Soil samples from a neighboring acre were also analyzed at time 0 and after 20 years. The arable land has been intensively farmed exclusively as arable land with various arable crops over the last 20 years. The organic carbon content of the arable land decreased from initially 1.04 wt. % to 0.86 wt. % (after 20 years).

According to NELSON and SOMMER (1996), the organic carbon content can be converted into the humus content by a factor of 1.724.

Thus, the humus content of arable land cultivated with various arable crops decreases from an initial 1.79% to 1.48% after 20 years.

The humus content of the cultivated coppice-with-standard according to the planting plan in FIG. 2 increased from an initial 1.724% to 2.6% in the 20th year. In the period from 0 to 20 years 44.9 t humus/ha are accumulated in the coppice strip (this value is shown in Table 1 as "DM-Humus-Accumulation"), 34 t humus/ha in the permanent forest strip (this value is shown in Table. 2 as "DM-Humus-Accumulation"), and 78.9 t humus/ha over the entire area.

When assessing the values, it should be noted that the thickness of the soil horizon was chosen at 70 cm instead of the usual 30 cm. This is because a forest is concerned and not an acre or a meadow, the trees also accumulate significant amounts of carbon at a depth of 30 to 70 cm.

In the 23rd year, a segment of the coppice-with-standard was cleared with the rotary tiller and the soil was reworked with plow and harrow. After clearing the coppice and permanent forest trees, the organic carbon content in the upper 70 cm of the soil horizon decreased from 1.5 wt % (20th year) to 1.1 wt % (measured in the 24th year) and from 153 t C/ha (20th year) to 115.5 t C/ha (24th year), respectively. This means that the C accumulation built up within 20 years is almost completely cancelled out by the approx. 40-50 cm deep tillage with the rotary tiller.

For this reason, no clearing of coppice trees should take place; instead, the remaining coppice trees, including their root systems, should remain in the stock and conserve the C accumulation that has thus built up over the years.

There were no significant differences between the two poplar species and the willow species with regard to the dry matter quantities according to Table 1. Therefore, the dry matter amounts of Table 1 are to be regarded as averaged amounts. The determination of DM foliage amounts was done by collecting, drying (110° C., 24 hours), and weighing the foliage from a 100 $m^2$ sector. Small amounts of foliage also fell to the ground on the side of the permanent forest strips, in particular "to the left" of the coppice strip (numeral 8a).

These amounts of foliage were nevertheless attributed to the coppice strip. The determination of the amounts of DM side vegetation took place by harvesting the above-ground biomass of a 100 $m^2$ sector at the beginning of October each year. Dry matter was determined by drying to constant weight (110° C., 24 hours) and weighing. The DM root litter was determined mathematically from the dry matter of the leaf litter, since there is a direct correlation. The DM root litter was calculated with 70% of the amount of DM leaf litter.

TABLE 1

Coppice strips according to Example 1

| | DM*-Foliage [t DM/ha*J] | DM-Side-Vegetation [t DM/ha*J] | DM-Root Litter [t DM/ha*J] | DM-Sum [t DM/ha*J] | C-Accumulation [t C/ha*J] | DM-Humus-Accumulation [t DM/ha*J] |
|---|---|---|---|---|---|---|
| Rotation 1 | | | | | | |
| 1st year | 0.2 | 3.0 | 0.1 | 3.3 | 0.6 | 0.9 |
| 2nd year | 0.8 | 3.2 | 0.6 | 4.6 | 0.8 | 1.3 |
| 3rd year | 2.0 | 2.0 | 1.4 | 5.4 | 0.9 | 1.6 |
| 4th year | 3.1 | 1.6 | 2.2 | 6.9 | 1.2 | 2.0 |
| Rotation 2 | | | | | | 0.0 | 0.0 |
| 5th year | 1.0 | 2.9 | 2.4 | 6.3 | 1.1 | 1.8 |
| 6th year | 2.0 | 2.5 | 3.0 | 7.5 | 1.3 | 2.2 |
| 7th year | 4.2 | 2.0 | 3.5 | 9.7 | 1.6 | 2.8 |
| 8th year | 7.0 | 1.8 | 4.5 | 13.3 | 2.2 | 3.8 |
| Rotation 3 | | | | | | 0.0 | 0.0 |
| 9th year | 1.0 | 2.5 | 3.2 | 6.7 | 1.1 | 1.9 |
| 10th year | 2.1 | 2.0 | 3.6 | 7.7 | 1.3 | 2.2 |
| 11th year | 4.3 | 1.6 | 4.0 | 9.9 | 1.7 | 2.8 |
| 12th year | 6.1 | 1.4 | 4.3 | 11.8 | 2.0 | 3.4 |
| Rotation 4 | | | | | | 0.0 | 0.0 |
| 13th year | 0.9 | 2.3 | 3.3 | 6.5 | 1.1 | 1.9 |
| 14th year | 2.0 | 1.8 | 3.7 | 7.5 | 1.3 | 2.2 |
| 15th year | 3.8 | 1.5 | 3.9 | 9.2 | 1.5 | 2.6 |
| 16th year | 5.4 | 1.1 | 4.1 | 10.6 | 1.8 | 3.0 |
| Rotation 5 | | | | | | 0.0 | 0.0 |
| 17th year | 0.8 | 1.9 | 3.0 | 5.7 | 1.0 | 1.6 |
| 18th year | 1.3 | 1.6 | 3.4 | 6.3 | 1.1 | 1.8 |
| 19th year | 2.9 | 1.4 | 3.6 | 7.9 | 1.3 | 2.3 |
| 20th year | 4.7 | 0.9 | 3.8 | 9.4 | 1.6 | 2.7 |
| Sum 20 J | 55.6 | 39.0 | 61.6 | 156.2 | 26.0 | 44.9 |

*DM = dry mass

TABLE 2

Permanent Forest Strips according to Example 1

|  | DM*-Foliage [t DM/ha*J] | DM-Side-Vegetation [t DM/ha*J] | DM-Root Litter [t DM/ha*J] | DM-Sum [t DM/ha*J] | C-Accumulation [t C/ha*J] | DM-Humus-Accumulation [t DM/ha*J] |
|---|---|---|---|---|---|---|
| 1st year | 0.005 | 3.5 | 0.0 | 3.5 | 0.6 | 1.0 |
| 2nd year | 0.008 | 4.6 | 0.0 | 4.6 | 0.8 | 1.3 |
| 3rd year | 0.013 | 5.0 | 0.0 | 5.0 | 0.8 | 1.4 |
| 4th year | 0.04 | 5.2 | 0.0 | 5.2 | 0.9 | 1.5 |
| 5th year | 0.1 | 5.1 | 0.0 | 5.2 | 0.9 | 1.5 |
| 6th year | 0.2 | 4.9 | 0.1 | 5.2 | 0.9 | 1.5 |
| 7th year | 0.5 | 5.3 | 0.4 | 6.2 | 1.0 | 1.8 |
| 8th year | 0.8 | 5.1 | 0.6 | 6.5 | 1.1 | 1.9 |
| 9th year | 1.0 | 4.8 | 0.7 | 6.5 | 1.1 | 1.9 |
| 10th year | 1.4 | 4.7 | 1.0 | 7.1 | 1.2 | 2.0 |
| 11th year | 1.5 | 4.3 | 1.1 | 6.9 | 1.1 | 2.0 |
| 12th year | 1.6 | 3.9 | 1.1 | 6.6 | 1.1 | 1.9 |
| 13th year | 1.8 | 3.5 | 1.3 | 6.6 | 1.1 | 1.9 |
| 14th year | 1.9 | 3.1 | 1.3 | 6.3 | 1.1 | 1.8 |
| 15th year | 2.1 | 2.8 | 1.5 | 6.4 | 1.1 | 1.8 |
| 16th year | 2.3 | 2.3 | 1.6 | 6.2 | 1.0 | 1.8 |
| 17th year | 2.3 | 2.1 | 1.6 | 6.0 | 1.0 | 1.7 |
| 18th year | 2.5 | 1.7 | 1.8 | 6.0 | 1.0 | 1.7 |
| 19th year | 2.7 | 1.5 | 1.9 | 6.1 | 1.0 | 1.7 |
| 20th year | 2.9 | 1.3 | 2.0 | 6.2 | 1.0 | 1.8 |
| Sum 20 years | 25.7 | 74.7 | 17.9 | 118.2 | 19.7 | 34.0 |

*DM = dry mass

TABLE 3

Carbon Balance according to Example 1

|  | C-Accumulation [t C/ha] | C-Emission Reduction [t C/ha] |
|---|---|---|
| Period: 0-20 Jahre |  |  |
| Thermal utilisation of wood chips obtained from short rotation cultivation | — | 60.0 |
| Humus build-up through conversion of leaf litter, root litter, and side-vegetation | 53.0 | — |
| Build-up of underground root mass in coppice strips | 15.0 | — |
| Stock of permanent forest trees through wood increment | 15.0 | — |
| Sum 1 | 83.0 | 60.0 |
| Sum 2 | 143.0 |  |

Example 2

Example 2 is shown in FIG. 8 and concerns a coppice-with-standard established strip-by-strip consisting of strips of permanent forest with group-planted permanent forest trees alternating with coppice strips with triple-row-planted coppice trees. In this example, the shortest distance between adjacent permanent forest corridors is 11 m and the shortest distance between adjacent coppice corridors is 10 m. In addition, the maximum coppice strip width (WC) is 9 m and the maximum permanent forest strip width (WPF) is of 8 m.

Example 3

Example 3 is shown in FIG. 7 and concerns a coppice-with-standard established strip-by-strip consisting of strips of permanent forest with group-planted permanent forest trees alternating with coppice strips with double-row-planted coppice trees. In this example, the shortest distance between adjacent permanent forest corridors is 4 m and the shortest distance between adjacent coppice corridors is 3.5 m. In addition, the minimum coppice strip width (WC) is 2.25 m and the minimum permanent forest strip width (WPF) is 1.75 m. The planting plan of Example 3 is a very closely laid out assembly of permanent forest strips and coppice strips with many transitions and a very low average width of permanent forest strips and coppice strips of 3.75 m.

This closely laid out plant assembly is particularly suitable for permanent forest tree species that have a small crown diameter and are preferably shade tolerant at the same time, such as spruce, fir, Douglas fir, hornbeam, sorb tree and yew.

Example 4

Example 4 is shown in FIG. 9 and concerns a coppice-with-standard established strip-by-strip consisting of single-row permanent forest strips with group-planted permanent forest trees alternating with coppice strips with double-row-planted coppice trees. In this example, the shortest distance between a permanent forest corridor and an immediately adjacent coppice corridor is 9 m.

In Example 4, the maximum design of the "shortest distance of a coppice corridor to an immediately adjacent permanent forest corridor" is implemented.

The planting plan shown is particularly suitable for the establishment of a commercial-permanent-forest with permanent forest tree species that have a large crown diameter. Mechanical harvesting of coppice trees is particularly easy in the planting plan shown due to the large spacing according to numeral 8*a*.

The invention claimed is:

1. A process for establishing a commercial-permanent-forest comprising:
  establishing a coppice-with-standard with at least three permanent forest strips comprising permanent forest trees and at least two coppice strips comprising coppice trees; and recurrent harvesting of the coppice trees of the at least two coppice strips with rotation periods of 3 to 5 years;

wherein the permanent forest trees established in the coppice-with-standard are not harvested completely during the process, but are removed individually up to a maximum overwood-target distance of 4 to 11 m, so that over time the coppice trees are darkened-out by the dominance of the permanent forest trees and the ratio of the wood stock in volume solid meters VSM) of permanent forest trees to coppice trees is at least 1, so that a commercial-permanent-forest is established, wherein coppice strips and permanent forest strips are arranged alternately, so that recurrently at least one coppice strip is arranged between two permanent forest strips immediately adjacent thereto, wherein the permanent forest trees in the permanent forest strips each form a permanent forest corridor, wherein the coppice trees in the coppice strips each form a coppice corridor, wherein the shortest distance between adjacent permanent forest corridors is 4 to 11 m, wherein the shortest distance between an outer-boundary of a permanent forest corridor and a nearest outer boundary of an immediately adjacent coppice corridor is 2.0 to 7 m.

2. The process according to claim 1, wherein an average permanent forest strip width (AWPF) is smaller than an average coppice strip width (AWC).

3. The process according to claim 1, wherein a permanent forest strip width (WPF) is 1.75 to 8.00 m and wherein a coppice strip width (WC) is 2.25 to 9.00 m.

4. The process according to claim 1, wherein at least 60% of all planted trees are coppice trees and wherein at most 40% of all planted trees are the permanent forest trees, based on a total number of trees planted when establishing the stock.

5. The process according to claim 1, wherein, when establishing the permanent forest strips, less than 50% shade is cast on the permanent forest trees in the permanent forest strips by the coppice trees, in particular the crown-canopy of the coppice trees, in the at least two coppice strips.

6. The process according to claim 1, wherein, when establishing the coppice strips, at least one coppice tree species is planted selected from the group consisting of poplars, willows, elder, and laburnum, and, when establishing the permanent forest strips, at least one tree species is planted which does not belong to the group of coppice tree species.

7. The process according to claim 1, wherein a shortest distance between adjacent coppice corridors is shorter than a shortest distance between adjacent permanent forest corridors.

8. The process according to claim 1, comprising a first and a second coppice strip, immediately adjacent to a permanent forest strip, wherein an outer-boundary-distance between the permanent forest corridor of the permanent forest strip and a coppice corridor of a first immediately adjacent coppice strip is different from an outer-boundary-distance between the permanent forest corridor of the permanent forest strip and a coppice corridor of a second immediately adjacent coppice strip.

* * * * *